(12) United States Patent
King et al.

(10) Patent No.: US 10,685,786 B2
(45) Date of Patent: Jun. 16, 2020

(54) PERFORMANCE OF CAPACITOR ELECTRODES

(71) Applicant: Pacesetter, Inc., Santa Clara, CA (US)

(72) Inventors: Justin King, Clemson, SC (US); Ralph Jason Hemphill, Sunset, SC (US)

(73) Assignee: Pacesetter, Inc., Santa Clara, CA (US)

( * ) Notice: Subject to any disclaimer, the term of this patent is extended or adjusted under 35 U.S.C. 154(b) by 0 days.

(21) Appl. No.: 15/942,077

(22) Filed: Mar. 30, 2018

(65) Prior Publication Data

US 2019/0304703 A1 Oct. 3, 2019

(51) Int. Cl.
| | |
|---|---|
| *H01G 9/02* | (2006.01) |
| *H01G 9/00* | (2006.01) |
| *H01G 13/06* | (2006.01) |
| *H01G 9/035* | (2006.01) |
| *H01G 9/052* | (2006.01) |
| *B05D 3/12* | (2006.01) |
| *B05D 3/06* | (2006.01) |
| *B05D 3/02* | (2006.01) |

(52) U.S. Cl.
CPC ............ *H01G 9/0029* (2013.01); *H01G 9/02* (2013.01); *H01G 9/035* (2013.01); *H01G 9/0525* (2013.01); *H01G 13/06* (2013.01); *B05D 3/0254* (2013.01); *B05D 3/06* (2013.01); *B05D 3/12* (2013.01)

(58) Field of Classification Search
CPC ........ H01G 9/0029; H01G 9/02; H01G 9/035; H01G 9/0525; H01G 13/06; B05D 3/0254; B05D 3/06; B05D 3/12

USPC .................................................... 427/79–81
See application file for complete search history.

(56) References Cited

U.S. PATENT DOCUMENTS

| | | | |
|---|---|---|---|
| 6,191,936 B1* | 2/2001 | Webber .................. | H01G 9/052 361/524 |
| 6,885,548 B2 | 4/2005 | Nyberg | |
| 7,154,742 B1* | 12/2006 | Hahn ...................... | H01G 9/048 361/528 |
| 7,177,140 B2 | 2/2007 | Clarke et al. | |
| 9,842,702 B1* | 12/2017 | Bowen ................. | H01G 9/0029 |
| 9,852,849 B2* | 12/2017 | Hemphill ............... | H01G 9/045 |
| 2009/0159322 A1* | 6/2009 | Wu ........................ | H01G 9/012 174/260 |
| 2010/0110615 A1* | 5/2010 | Nishimura ............... | H01G 9/15 361/528 |
| 2012/0051941 A1* | 3/2012 | Bunker ................... | F01D 5/186 416/97 R |
| 2014/0036417 A1* | 2/2014 | Fujimoto ............. | H01G 9/0425 361/532 |
| 2014/0268502 A1* | 9/2014 | Biler ..................... | H01G 9/052 361/525 |
| 2014/0321029 A1* | 10/2014 | Djebara ................. | H01G 9/052 361/525 |
| 2015/0371782 A1 | 12/2015 | Taira et al. | |
| 2018/0354069 A1* | 12/2018 | Erickson ............ | B23K 26/0626 |

FOREIGN PATENT DOCUMENTS

WO         0203404         1/2002

* cited by examiner

*Primary Examiner* — Brian K Talbot

(57) ABSTRACT

Fabricating a capacitor includes using a fluid jet to form a conduit in a sheet of material. A capacitor can include at least a portion of the sheet of material in an anode. In some instances, the sheet of material is porous before the fluid jet is used to form the conduit.

25 Claims, 11 Drawing Sheets

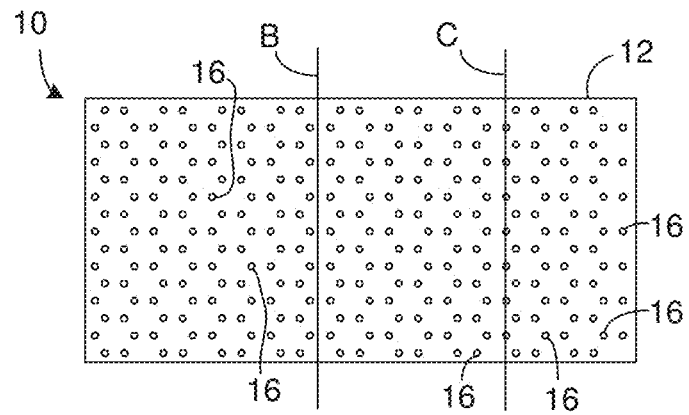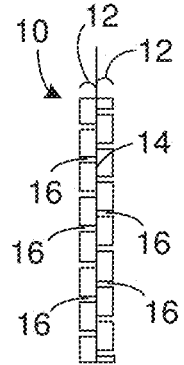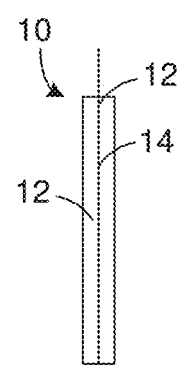
Figure 1A  Figure 1B  Figure 1C
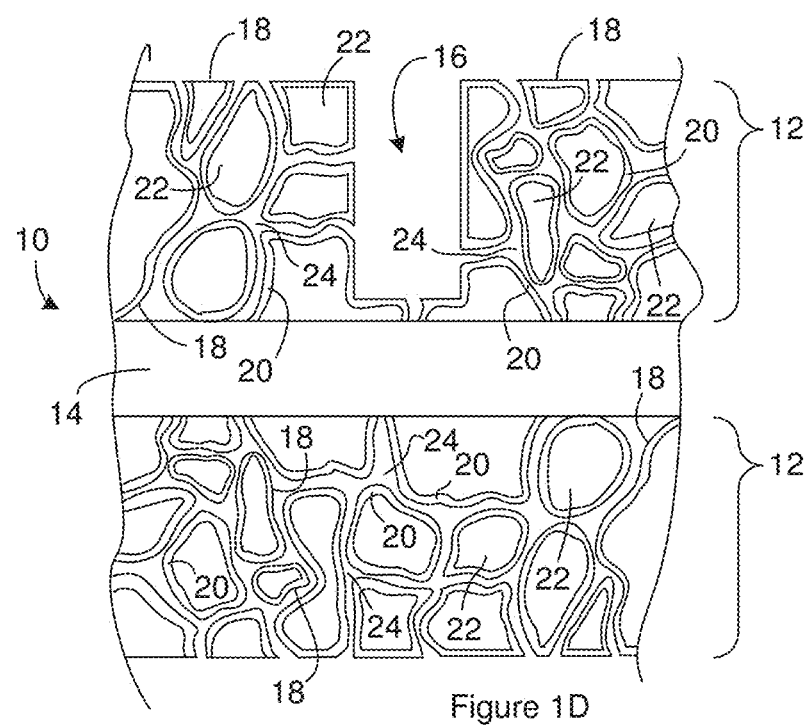
Figure 1D

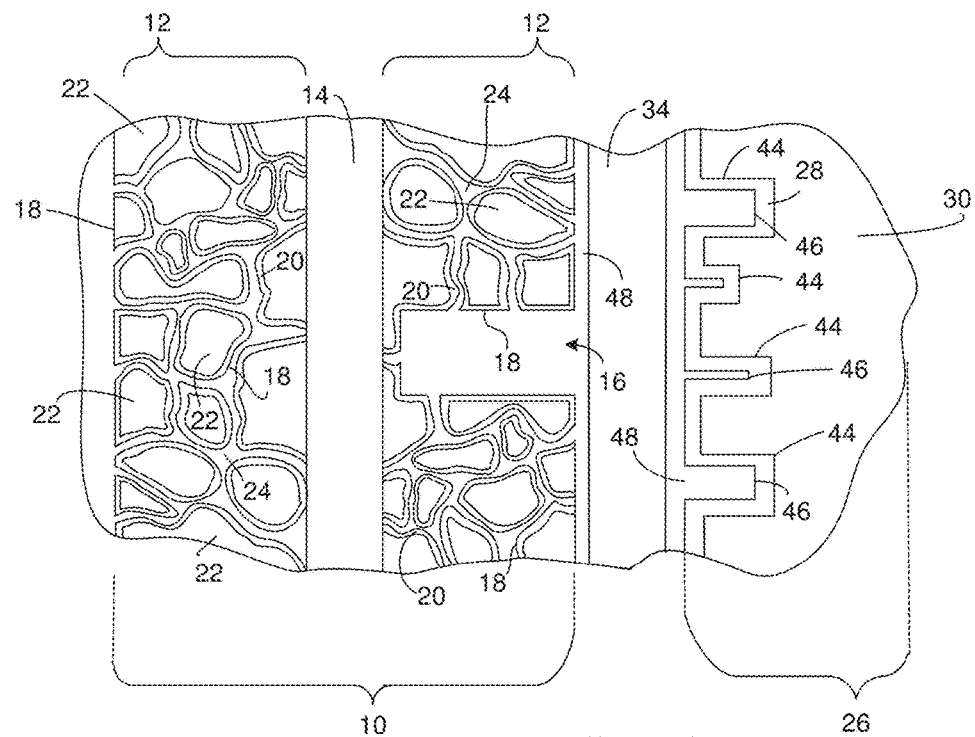
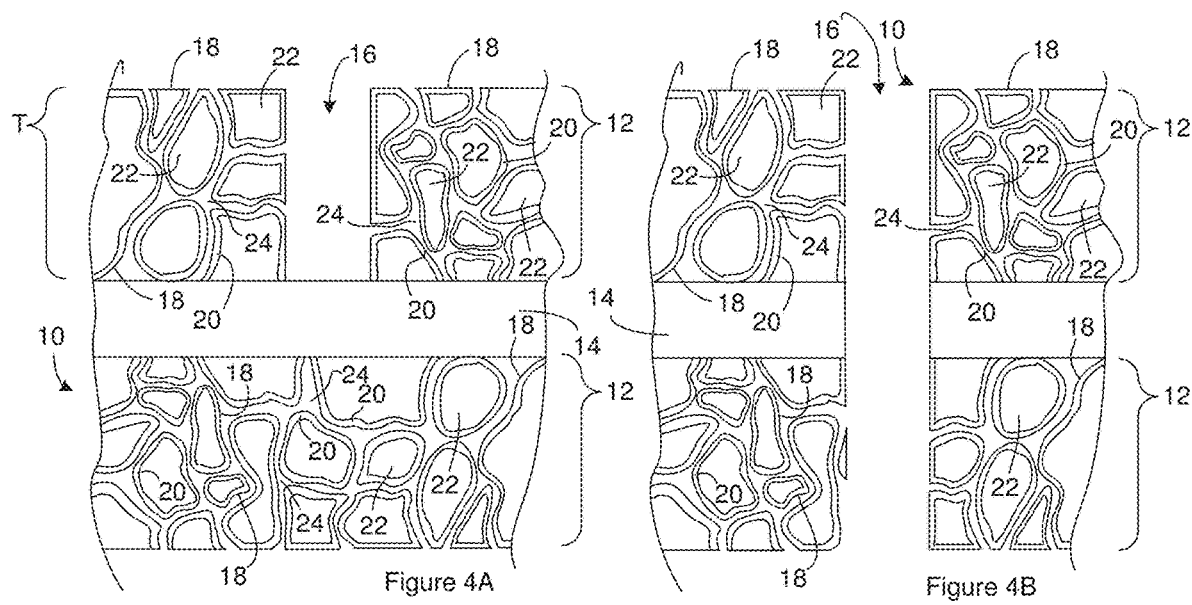
Figure 3D
Figure 4A  Figure 4B

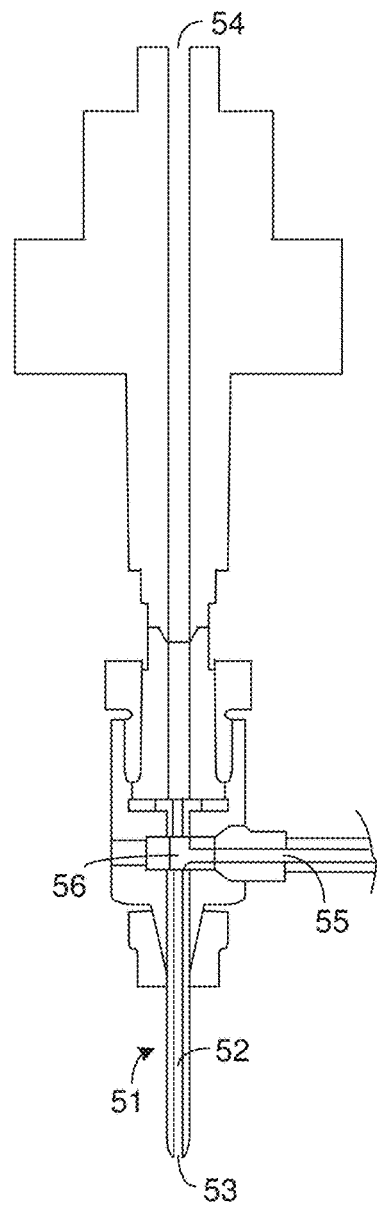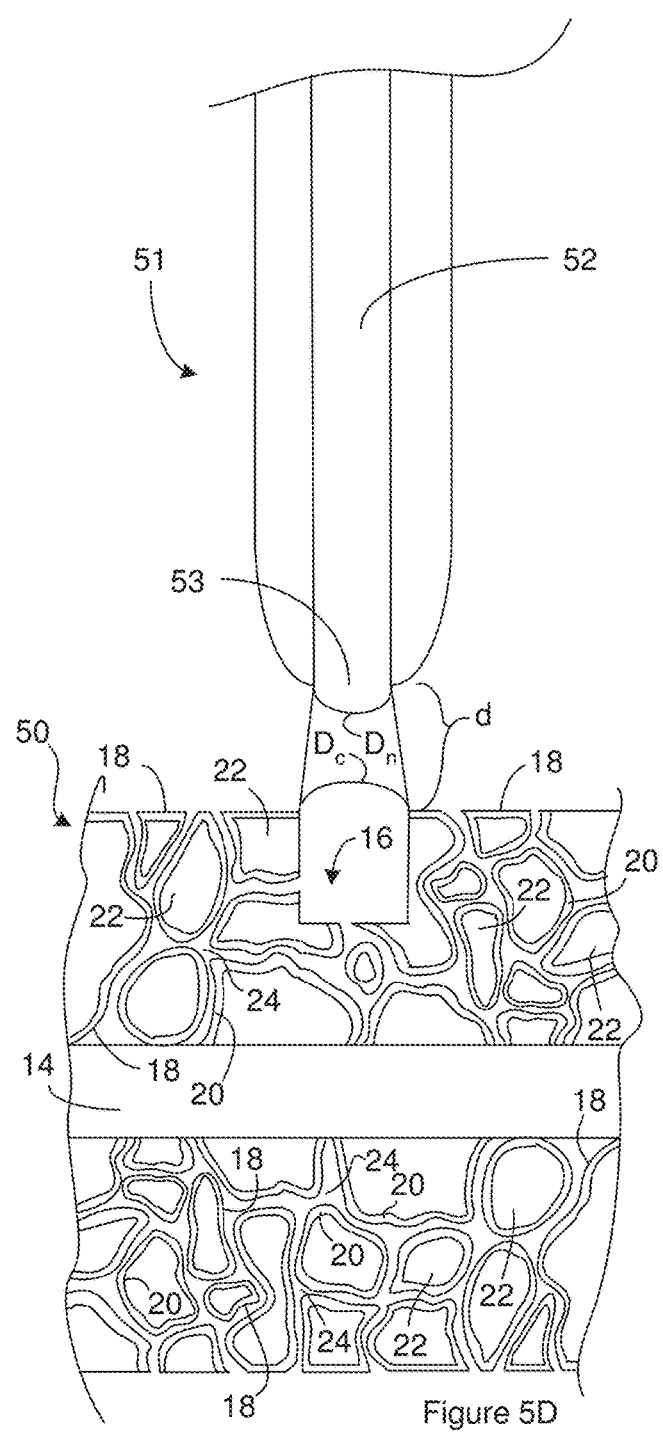
Figure 5C
Figure 5D

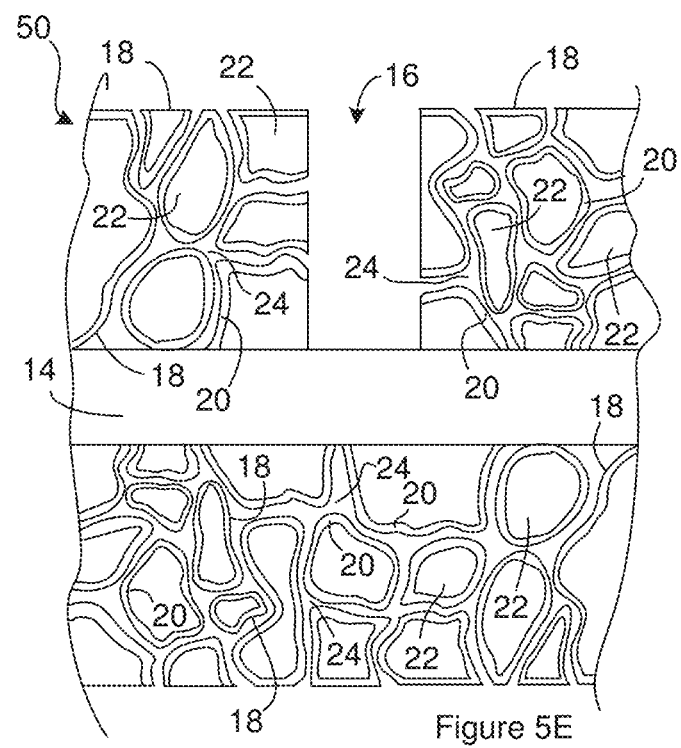
Figure 5E
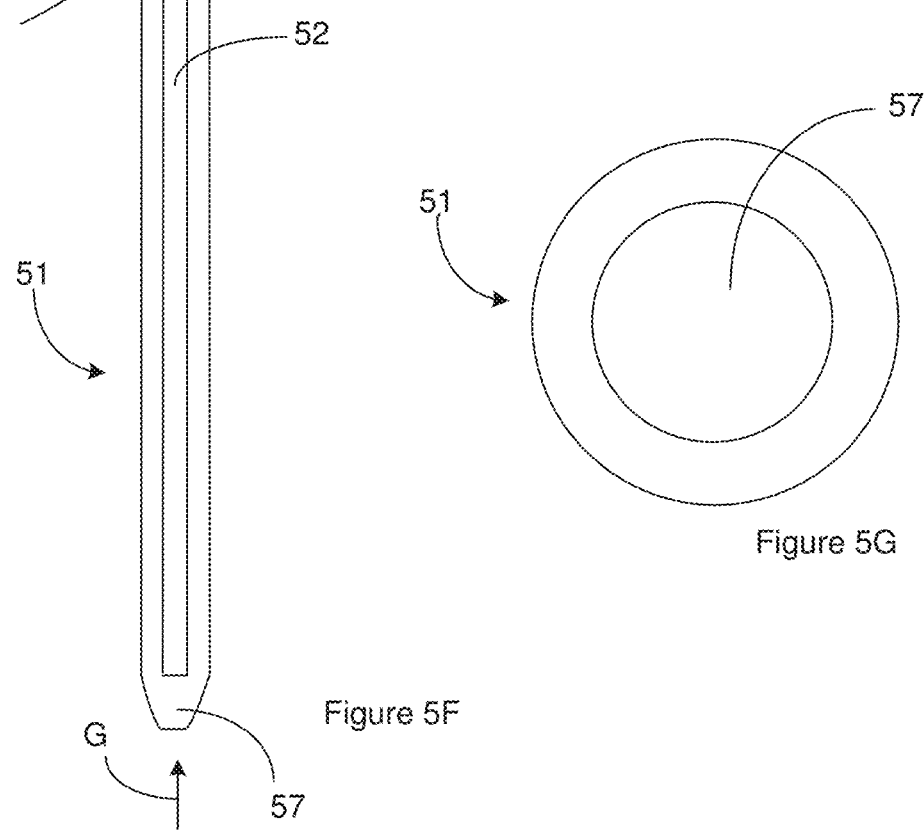
Figure 5F
Figure 5G

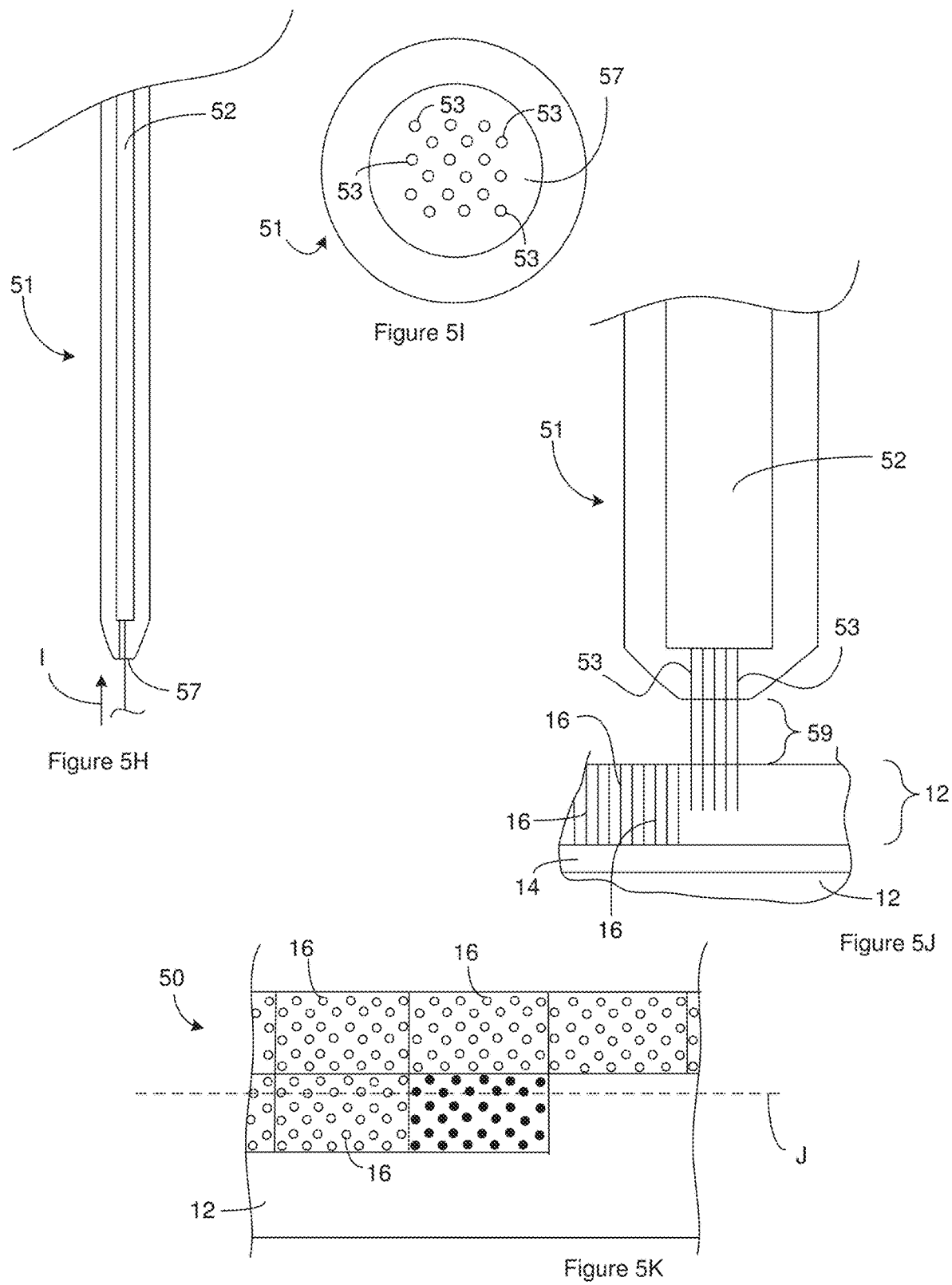

PERFORMANCE OF CAPACITOR ELECTRODES

FIELD

The invention relates to electrochemical devices. In particular, the invention relates to capacitors.

BACKGROUND

Increasing the surface area of the anodes in many types of capacitors can increase capacitance. One approach to increasing the surface area is to form the anode from powder particles that are fused together such that pores are positioned between different fused particles. These pores provide the desired increase in the surface area of the anode; however, these capacitors have suffered from an inability to get both the capacitance and the delivered to stored energy ratio (electrical porosity) above desired target levels. For the above reasons, there is a need for improved capacitor anodes.

SUMMARY

Fabricating a capacitor includes using a fluid jet to form a conduit in a material. The capacitor is assembled with an anode that includes at least a portion of the material in which the conduit was formed. In some instances, the material is porous before the fluid jet is used to form the conduit.

BRIEF DESCRIPTION OF THE FIGURES

FIG. 1A through FIG. 1D illustrate the construction of an anode for use in a capacitor. FIG. 1A is a sideview of an anode that is suitable for use in the capacitor. The anode includes conduits extending into an active layer.

FIG. 1B is a cross-section of the anode shown in FIG. 1A taken along the line labeled B in FIG. 1A.

FIG. 1C is a cross-section of the anode shown in FIG. 1A taken along the line labeled C in FIG. 1A.

FIG. 1D is a cross section of a portion of the anode shown in FIG. 1A through FIG. 1C. FIG. 1D shows more details of the relationship between a conduit and the components of the active layer. The conduit extends part way into the active layer.

FIG. 3D is a sideview of an interface between an anode and a cathode that are adjacent to one another in the capacitor of FIG. 3B.

FIG. 4A is a cross section of a portion of the anode shown in FIG. 1A through FIG. 1C. A conduit extends through an active layer to an underlying current collector.

FIG. 4B is a cross section of a portion of the anode shown in FIG. 1A through FIG. 1C. A conduit extends through the entire anode.

FIG. 5A is a cross section of a sheet of material that has fused particles on a current collector. An anode precursor will be extracted from the sheet of material at a later stage of the method.

FIG. 5C is a cross section of a structure for forming a fluid jet.

FIG. 5D illustrates a nozzle from the jet-forming structure of FIG. 5C being used to form a conduit in the sheet of material of FIG. 5B.

FIG. 5E illustrates the conduit of FIG. 5D extending through a fused particle layer to an underlying current collector.

FIG. 5F and FIG. 5G illustrate a nozzle precursor. FIG. 5F is a cross section of the nozzle precursor.

FIG. 5G is a sideview of the nozzle precursor taken looking in the direction of the arrow labeled G in FIG. 5F.

FIG. 5H illustrates one or more nozzle openings formed in the nozzle precursor of FIG. 5F and FIG. 5G. FIG. 5H shows one fully formed nozzle opening and another nozzle opening in the process of being formed.

FIG. 5I is a sideview of the nozzle precursor of FIG. 5H after multiple nozzle openings have been formed in the nozzle precursor.

FIG. 5J illustrates a nozzle concurrently forming multiple conduits in a sheet of material.

FIG. 5K is a topview of a sheet of material where multiple different sets of conduits have been formed in the sheet of material. FIG. 5J could be a cross section of the sheet of material shown in FIG. 5K taken along the line labeled J in FIG. 5K.

FIG. 5O illustrates tracks selected so as to provide an edge of an anode with the desired shape.

DESCRIPTION

Figures 2A, 2B:
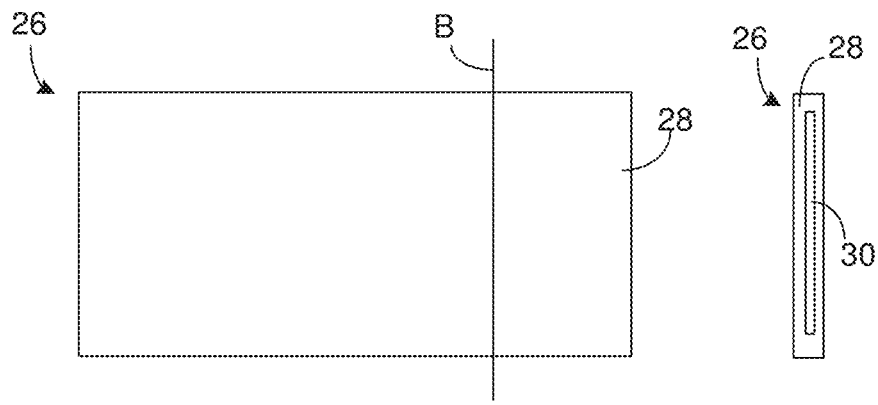
FIG. 2A is a sideview of a cathode that is suitable for use in the capacitor.
FIG. 2B is a cross-section of the cathode shown in FIG. 2A taken along the line labeled B in FIG. 2A.

The capacitor has an anode with an active layer that includes fused particles. Voids between the fused particles provide pores through which an electrolyte can travel through the active layer. In some instances, these active layers are formed using techniques such as sintering of a powder. It has been found that the capacitance of such a capacitor increased by decreasing the average size of the powder particles that are subsequently fused together. However, decreasing the size of the powder particles results in narrower and more tortuous pore pathways. The small width of the pores combined with the tortuous nature of their path through the active layer generates resistance to the movement of electrolyte through the pores. This reduced movement of the electrolyte through the pores reduces the delivered to stored energy ratio (electrical porosity) of the capacitor.

The active material includes conduits that can extend from a surface of the active layer into the active layer. The average width of the conduits can be on the order of more than twice the average width of the pores. Additionally, the pores can be open to the interior of the conduits. Accordingly, the electrolyte can easily flow in and out of the conduits where it can enter and/or exit from the pores through the conduits. As a result, the conduits provide a larger pathway from the exterior surface of an active layer to pores that are deep within the active layer. The larger pathway reduces the resistance of the active layer to the movement of electrolyte through the active layer and accordingly increases the delivered to stored energy ratio (electrical porosity). As a result, the conduits make it possible for the active layer to have the higher capacity associated with narrow and tortuous pores and also to have an elevated electrical porosity.

The fused particles can include a layer of dielectric on a core. Methods for forming the conduits that apply high levels of heat to the fused particles can convert the dielectric from a desirable phase to an undesirable phase. For instance, forming the conduits with a technique such as laser drilling can convert an anode metal oxide such as aluminum oxide from the desisrable boehmite phase ($Al_2O_3$) to an undesirable phase called alpha phase corundum oxide ($\alpha$-$Al_2O_3$). The inventors have found that using a fluid jet such as a water jet to drill the conduits does not convert the dielectric to these undesirable phases. Additionally, nozzles can be adapted to produce multiple fluid jets that can concurrently form different conduits. As a result, using fluid jets can simplify the fabrication process. Further, the inventors have found that fluid jets can provide surprisingly small diameter conduits in the fused particles. For instance, the fluid jets have been able to provide conduits with a diameter less than 50 microns. As a result, fluid jets can also provide the desired conduit geometries.

FIG. 1A through FIG. 1D illustrate the construction of an anode for use in a capacitor. FIG. 1A is a sideview of an anode 10 that is suitable for use in the capacitor. FIG. 1B is a cross-section of the anode shown in FIG. 1A taken along the line labeled B in FIG. 1A. FIG. 1C is a cross-section of the anode shown in FIG. 1A taken along the line labeled C in FIG. 1A.

The anode 10 includes one or more active layers 12 on a current collector 14. The illustrated anode 10 includes the current collector 14 positioned between active layers 12. Suitable current collectors 14 include, but are not limited to, foils, meshes, and screens. FIG. 1A through FIG. 1C show a portion of the current collector 14 extending beyond the one or more active layers 12. The exposed portion of the current collector 14 is optional and can be used for making electrical connections to the anode 10. Conduits 16 extend into the active layers 12. The conduits 16 are shown with circular cross sections although other configurations are possible.

FIG. 1D is a cross section of a portion of the anode 10 shown in FIG. 1A through FIG. 1C. The cross section is taken through a conduit 16 and shows more details of the active layer 12 construction than is shown in FIG. 1A through FIG. 1C. The active layers 12 include particles that are fused together (fused particles 18). For instance, the active layers 12 can include sintered powder particles. As a result, a single fused particle 18 shown in FIG. 1D may represent a single particle of a powder or can represent two or more particles of powder that are fused together.

The fused particles 18 include, consist of, or consist essentially of a layer of a dielectric 20 on a core 22. The cores 22 can be electrically conducting and one or more of the cores 22 can be in direct physical contact with the current collector 14. Additionally, the fusion of the fused particles 18 provides an electrical pathway between different cores 22. As a result, the cores 22 are in electrical communication with the current collector 14.

In some instances, the dielectric 20 is an anode metal oxide and the core 22 is an electrical conductor such as an anode metal. The anode metal oxide can be an oxide of an anode metal included in the core 22. Suitable anode metals include, but are not limited to, aluminum, tantalum, magnesium, titanium, niobium, and zirconium. Many anode metal oxides can exist in more than one phase within the same material state (solid, liquid, gas, plasma). For instance, an anode metal oxide such as aluminum oxide can be in a solid first phase called the boehmite phase ($Al_2O_3$) or a second phase called alpha phase corundum oxide ($\alpha$-$Al_2O_3$) that is also a solid.

The active layer 12 includes pores 24 that result from the voids between adjacent fused particles 18 and that are present throughout the active layer 12. The pores 24 have non-uniform diameters and/or non-uniform cross sections and follow tortuous pathways through the active layer 12. A suitable porosity for portions of the active layer 12 that do not include any conduits 16 include, but are not limited to, porosity greater than 1%, 2% or 5% and/or less than 10%, 20% or 30%. An average width for the pores is greater than 0.1 µm, 1 µm, or 5 µm, and/or less than 100 µm, or 200 µm.

The conduits 16 extend from an exterior surface of an active layer 12 into the active layer 12 toward the current collector 14. The conduits 16 are fabricated after fusing the particles. The conduits 16 can be fabricated in a way that cuts through individual fused particles 18. As a result, the portion of the fused particles that define the conduits 16 can be smooth or substantially smooth. The dielectric 20 on the fused particles 18 defines the walls of the conduits 16. Accordingly, a medium located in the conduits 16 can be in direct physical contact with the dielectric 20. For instance, in a completed capacitor, an electrolyte in the conduits 16 can be in direct physical contact with the dielectric 20.

In some instances, the conduits 16 are fabricated to have a uniform or substantially uniform diameter and/or width along the depth of the conduit 16. In some instances, the length of the conduits 16 is perpendicular or substantially perpendicular to a surface of the current collector 14 and/or to a surface of the active layer 12. Additionally, the conduits 16 can be straight or substantially straight along their length. Accordingly, the conduits 16 can follow a less tortuous pathway through an active layer 12 than is followed by the pores 24.

FIG. 2A is a sideview of a cathode 26 that is suitable for use in the capacitor. FIG. 2B is a cross-section of the cathode 26 shown in FIG. 2A taken along the line labeled B in FIG. 2A. The cathode 26 includes a layer of cathode metal oxide 28 over a layer of a cathode metal 30. Suitable cathode metals 30 include, but are not limited to, aluminum, titanium, and stainless steel. Although not illustrated, the cathode metal 30 can be layer of material on a substrate. For instance, the cathode metal 30 can be a titanium or titanium nitride coating on a substrate such as a metal and/or electrically conducting substrate. Examples of suitable substrates include, but are not limited to, aluminum, titanium, and stainless steel substrates. The cathode metal oxide 28 can be formed on the cathode metal 30 by oxidizing the cathode metal 30 in air. The cathode metal 30 can be the same as the anode metal or different from the anode metal. In some instances, the cathode metal 30 and the anode metal are both aluminum. As illustrated in FIG. 2B, in some instances, the cathode metal oxide 28 surrounds the cathode metal 30. For instance, the cathode metal oxide 28 is positioned over the edges and faces of the cathode metal 30.

Figures 3A, 3B:
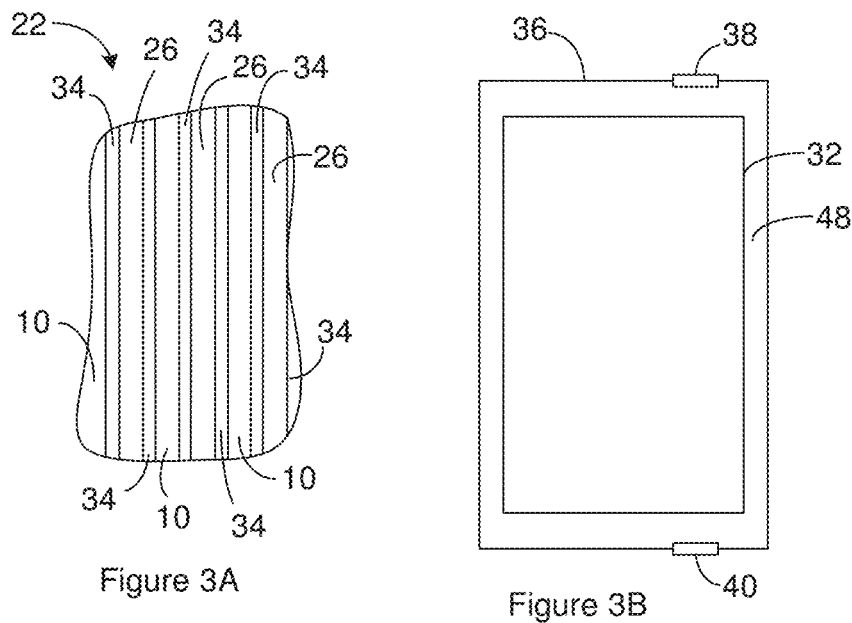
FIG. 3A is a cross section of an electrode assembly where anodes are alternated with cathodes.
FIG. 3B is a schematic diagram of a capacitor that includes the electrode assembly of FIG. 3A positioned in a capacitor case.

The anodes 10 and cathodes 26 are generally arranged in an electrode assembly 32 where one or more anodes 10 are alternated with one or more cathodes 26. For instance, FIG. 3A is a cross section of an electrode assembly 32 where anodes 10 are alternated with cathodes 26. The anodes 10 and cathodes 26 can be constructed according to FIG. 1A through FIG. 2B. A separator 34 is positioned between anodes 10 and cathodes 26 that are adjacent to one another in the electrode assembly 32. The electrode assembly 32 typically includes the anodes 10 and cathodes 26 arranged in a stack or in a jelly roll configuration. Accordingly, the cross section of FIG. 3A can be a cross section of an electrode assembly 32 having multiple anodes 10 and multiple cathodes 26 arranged in a stack. Alternately, the cross section of FIG. 3A can be created by winding one or more anodes 10 together with one or more cathodes 26 in a jelly roll configuration. However, as the anodes 10 become more brittle due to increased surface area, it may not be practical or possible to form a jellyroll configuration. Suitable separators 34 include, but are not limited to, kraft paper, fabric gauze, and woven for non-woven textiles made of one or a composite of several classes of nonconductive fibers such as aramids, polyolefins, polyamides, polytetrafluoroethylenes, polypropylenes, and glasses.

The electrode assembly 32 is included in a capacitor. For instance, FIG. 3B is a schematic diagram of a capacitor that includes the electrode assembly 32 of FIG. 3A positioned in a capacitor case 36. Although not illustrated, the one or more anodes 10 in the electrode assembly 32 are in electrical communication with a first terminal 38 that can be accessed from outside of the capacitor case 36. The one or more cathodes 26 in the electrical assembly are in electrical communication with a second terminal 40 that can be accessed from outside of the capacitor case 36. In some instances, the one or more anodes 10 include or are connected to tabs (not shown) that provide electrical communication between the one or more anodes 10 and the first terminal 38 and the one or more cathodes 26 include or are connected to tabs (not shown) that provide electrical communication between the one or more cathodes 26 and the second terminal 40. The capacitor can include one or more electrical insulators (not shown) positioned as needed to prevent shorts-circuits within the capacitor.

Figure 3C:
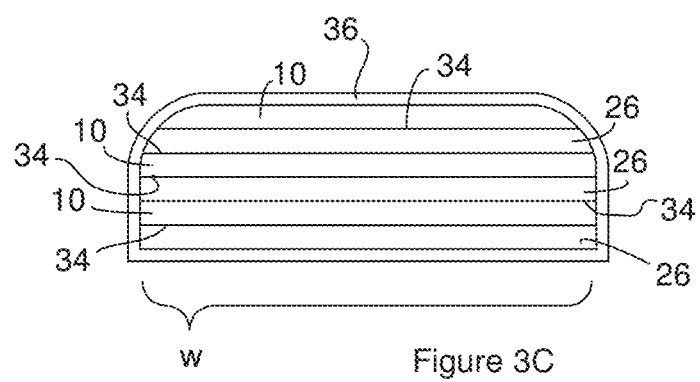
FIG. 3C is a cross section of a capacitor illustrating the positioning of the electrode assembly relative to the capacitor case.

FIG. 3C is a cross section of a capacitor illustrating the positioning of the electrode assembly 32 relative to the capacitor case 36. The first terminal 38 and the second terminal 40 are not shown in FIG. 3C. The illustrated electrode assembly 32 includes anodes 10 and cathodes 26 stacked such that anodes 10 are alternated with cathodes 26 and separators 34 are positioned between adjacent anodes 10 and cathodes 26. The upper side of the capacitor case 36 is curved. In order to make best use of the space that is available in the case, the electrode assembly 32 is configured to conform to the interior of the capacitor case 36. As a result, a portion of the anodes 10 and/or cathodes 26 have tapered edges that allow these electrodes to be positioned adjacent to the curved portion of the capacitor case 36. As is evident in FIG. 3C, the ability to shape the electrode edges increases the packing efficiency of the electrodes within the capacitor case. Further, the conduits may make it possible to use a thicker anode. The use of thicker anodes can also improve packing efficiency because fewer anodes would be needed in the capacitor case. When the disclosed anodes are included in an Implantable Cardioverter Defibrillator (ICD), a suitable thickness for the anodes may include a thickness greater than 100 µm or 400 µm and/or less than 500 µm or 1000 µm. Additionally or alternatively, different electrodes within the electrode assembly 32 can have different sizes. For instance, the electrodes closer to the top of the capacitor case 36 shown in FIG. 3C can have a smaller width (labeled w in FIG. 3C) or diameter.

FIG. 3D is a sideview of an interface between an anode 10 and a cathode 26 that are adjacent to one another in the capacitor of FIG. 3B. The illustration in FIG. 3D is magnified so it shows features of the anode 10 and cathode 26 that are not shown in FIG. 2A and FIG. 2B. For instance, the surface of the cathode 26 optionally includes cathode channels 44 that extend into the cathode metal 30 so as to increase the surface area of the cathode metal 30. Suitable cathode channels 44 include, but are not limited to, pores, trenches, tunnels, recesses, and openings. The cathode metal oxide 28 can be positioned on the surface of the cathode metal 30. When the cathode metal 30 includes cathode channels 44, the cathode metal oxide 28 can be positioned in the cathode channels 44. The cathode metal oxide 28 can fill the cathode channels 44 and/or cathode oxide channels 46 can extend into the cathode metal oxide 28.

An electrolyte 48 is in contact with the separator 34, the anode 10 and the cathode 26. The electrolyte 48 can be positioned in the pores 24 of the active layers 12. The components of the anode 10 can be positioned on the cores 22 such that the cores 22 do not directly contact the electrolyte 48. For instance, the dielectric 20 and the current collector 14 can prevent direct contact between the cores 22 and the electrolyte 48. In some instances, the dielectric 20, an oxide, and the current collector 14 can prevent direct contact between the cores 22 and the electrolyte 48. For instance, the oxide can form on the surface of the core when the electrolyte and core come into contact while an electrical potential is applied to the cores.

When the cathode metal 30 includes cathode oxide channels 46, the electrolyte 48 can be positioned in the cathode oxide channels 46. The electrolyte 48 can be a liquid, solid, gel or other medium and can be absorbed in the separator 34. The electrolyte 48 can include one or more salts dissolved in one or more solvents. For instance, the electrolyte 48 can be a mixture of a weak acid and a salt of a weak acid, preferably a salt of the weak acid employed, in a polyhydroxy alcohol solvent. The electrolytic or ion-producing component of the electrolyte 48 is the salt that is dissolved in the solvent.

A capacitor constructed according to FIG. 3A through FIG. 3D can be an electrolytic capacitor such as an aluminum electrolytic capacitor, a tantalum electrolytic capacitor or a niobium electrolytic capacitor. An electrolytic capacitor is generally a polarized capacitor where the anode metal oxide serves as the capacitor dielectric and the electrolyte 48 effectively operates as the cathode.

It has been found that the capacitance of a capacitor constructed according to FIG. 3A through FIG. 3D can be increased by decreasing the average size of particles that are subsequently fused together. For instance, when the fused particles 18 are generated by fusing powder particles, the capacitance of the capacitor constructed can be increased by decreasing the average size of powder particles. However, the decreasing size of the particles that are subsequently fused together is also associated with narrower and more tortuous pore pathways. The small width of the pores 24 combined with the tortuous nature of their path through the active layer 12 generates resistance to the movement of electrolyte 48 through of the pores 24. Reduced movement of electrolyte 48 through the pores 24 reduces the delivered to stored energy ratio (electrical porosity). The conduits 16 help to overcome this issue. For instance, the average width of the conduits 16 can be on the order to 2-20 times the average width of the pores 24. Additionally, as is evident from FIG. 1D, the pores 24 are open to the interior of the conduits 16 along the depth of the conduit 16. Accordingly, the electrolyte 48 can easily flow through of the conduits 16 where it can enter and/or exit from the pores 24 through the conduits 16. As a result, the conduits 16 provide a larger pathway from the exterior surface of an active layer 12 to pores 24 that are deep within the active layer 12. The larger pathway reduces the resistance of the active layer 12 to the movement of electrolyte 48 in and out of the active layer 12 and accordingly increases the delivered to stored energy ratio (electrical porosity). The conduits 16 permit the capacitor to have delivered to stored energy ratio (electrical porosity) greater than 0.85:1 or 0.90:1 and/or less than 0.95:1. In application such as Implantable Cardioverter Defibrillator (ICD), it is desirable for the delivered to stored energy ratio (electrical porosity) to be at or above 0.90 for packaging efficiency and to improve the battery life per battery volume due to a reduction in the amount of stored energy needed for the battery to charge the capacitor to deliver the same output energy.

One or more variable selected from the group consisting of the width, average width, diameter and average diameter of a conduit 16 can be more than 0.1 μm, 1 μm, or 50 μm and/or less than 200 μm, 500 μm, or 1000 μm. Additionally or alternatively, one or more variable selected from the group consisting of the width, average width, diameter and average diameter of the conduits 16 can be more than 1, 2, 5, or 10 times the average width of the pores 24 and/or less than 20, 50, 100, or 200 times the average width of the pores 24 times the average width of the pores 24. In some instances, the aspect ratio or average aspect ratio of the conduits 16 is greater than 32:1 and/or less than 4200:1. As will be described in more detail below, the conduits 16 can be formed by drilling with a fluid jet. The upper limit for the aspect ratio of conduits 16 formed in a quarter inch thick material with fluid jets is generally less than 4200:1.

The conduits 16 can be arranged in a two-dimensional periodic pattern. For instance, FIG. 1A shows the conduits 16 arranged in hexagonal pattern. Arranging the conduits 16 in a two-dimensional pattern can increase the uniformity of electrolyte flow in and out of the pores 24 across the active layer 12. Other examples of suitable patterns for the conduits 16 include, but are not limited to, square and triangular. Other arrangements for the conduits 16, including random arrangements, can be used; however, random or pseudorandom patterns may result in an uneven flow of electrolyte in and out of the pores 24 across the active layer 12.

Increasing the average density of the porosity openings across the surface of the active layer 12 can increase the uniformity of electrolyte flow in and out of the active layer 12 across the active layer 12. However, increasing the number of conduits 16 can also reduce the surface area of the active layer 12 and accordingly reduce the capacitance. A suitable average density of the conduits across the surface of the active layer 12 includes, but is not limited to, an average density greater (ratio of active layer surface area that is not occupied by an opening to a conduit: active layer surface area that is occupied by the opening to a conduit) than 1:1, 20:1, or 50:1 and/or less than 200:1, 500:1, or 1000:1.

The conduit density that is desired can be a function of the conduit depth. For instance, deeper conduits can permit the conduit density to be reduced. Additionally or alternatively, the desired conduit density can be a function of the conduit diameter or conduit width. Conduits with smaller diameters or widths can be arranged at higher densities while conduits with larger diameters or widths can be arranged at lower densities. For instance, conduits with a diameter or width of 100-300 μm can have an average center-to-center spacing of around 500 to 1500 μm while conduits with a diameter or width of 1-50 μm can have an average center-to-center spacing of around 1.5 to 500 microns.

Although FIG. 1D shows a conduit 16 extending part way through the thickness of the active layer 12, the conduits 16 can extend through an active layer 12 to the underlying current collector 14 as shown in FIG. 4A. Alternately, the conduits 16 can extend through the anode and/or through both active layers 12 and the current collector as shown in FIG. 4B. The active layers 12 have a thickness that is labeled T in FIG. 4A and is measured in a direction perpendicular to a surface of the current collector 14. When the conduit 16 extends part way through the thickness of the active layer 12, a suitable depth for the conduits 16 includes, but is not limited to, depths that are greater than 50% and/or less than 100% of the thickness of the active layer 12.

Figure 5A:
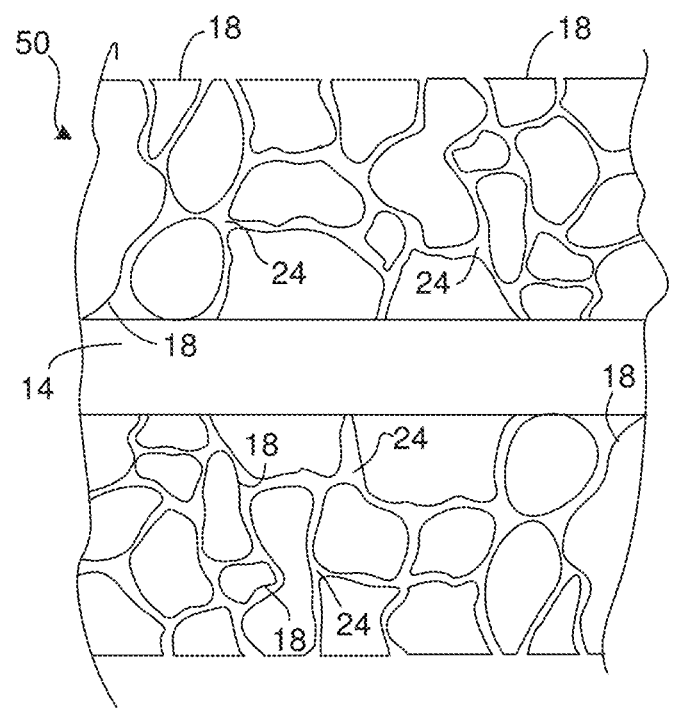
FIG. 5A through FIG. 5O illustrate a method of generating an anode for use in a capacitor constructed according to FIG. 1A through FIG. 3D.
Figure 5B:
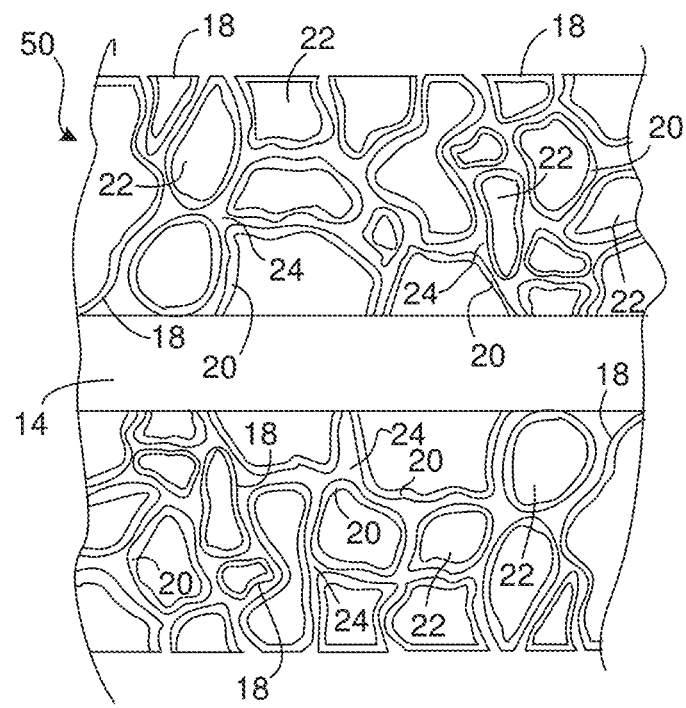
FIG. 5B is a cross section of the sheet of material of FIG. 5A after dielectrics are formed on the fused particles so as to provide fused particles that each have the dielectric on a core.
Figure 5L:
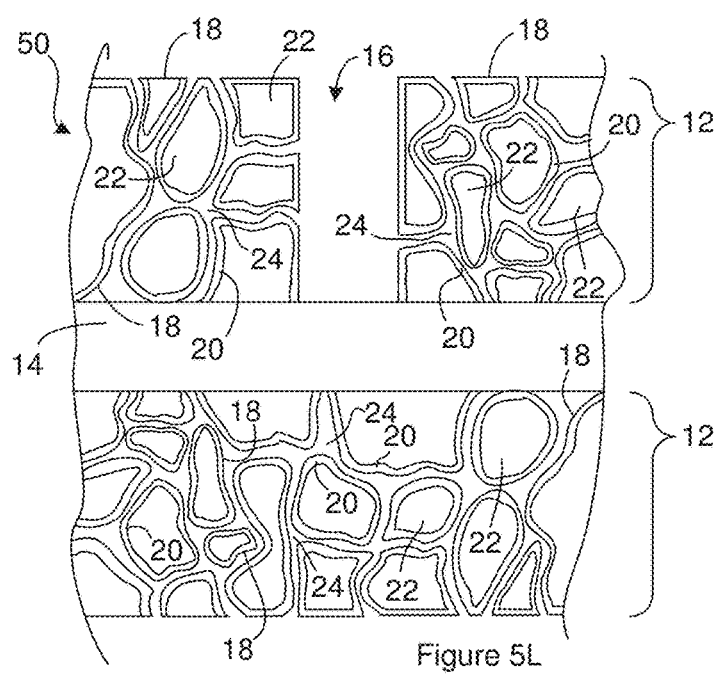
FIG. 5L is a cross section of the sheet of material of FIG. 5E after a dielectric is formed on exposed cores of the fused particles.
Figure 5M:
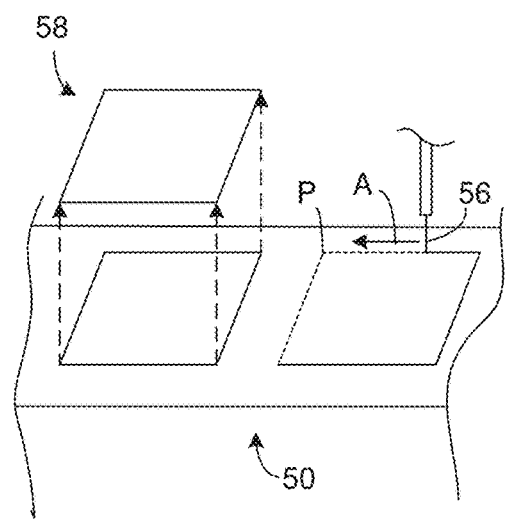
FIG. 5M illustrates extraction of anode precursor from the sheet of material of FIG. 5E, or FIG. 5L.
Figure 5N:
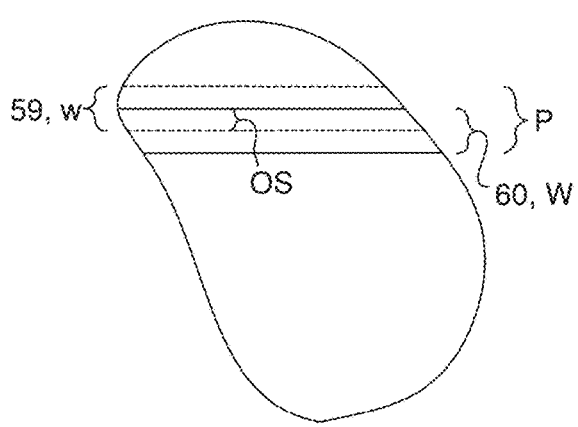
FIG. 5N is a topview of a portion of a sheet of material having a laser pathway with multiple different tracks.
Figure 5O:
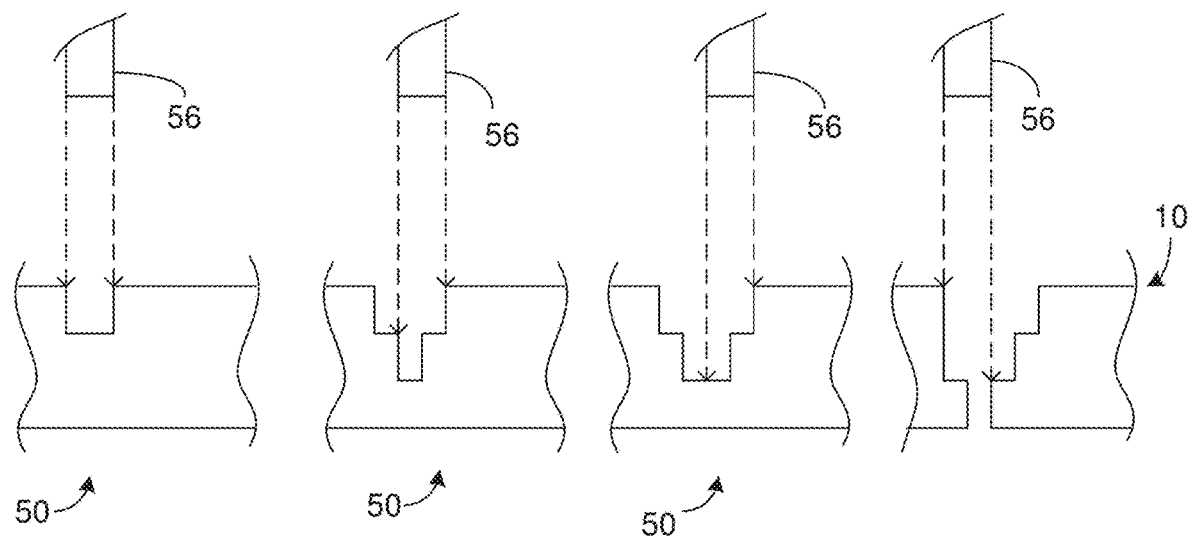

FIG. 5A through FIG. 5O illustrate a method of generating an anode 10 for use in a capacitor constructed according to FIG. 1A through FIG. 3D. FIG. 5A is a cross section of a sheet of material 50 that has fused particles 18 on a current collector 14. An anode precursor will be extracted from the sheet of material 50 at a later stage of the method. Suitable methods of generating the sheet of material 50 include, but are not limited to, sintering of powder on the current collector 14. Sintering includes pressing and/or compacting the powder without melting the powder to the point of liquefaction. Heat may or may not be applied during the sintering process.

In some instances, the powder used in generating the sheet of material 50 can have a constant diameter or width. However, in other instances, the powder used in generating the sheet of material 50 can have a variety of different diameters or widths. Since smaller particles can fit into the pores 24 between larger particles, a variety of different powder sizes can increase the surface area of the active layer 12. Suitable diameters or widths or average diameters or average widths for the powder can be greater than 2 μm, 4 μm, or 5 μm, and/or less than 6 μm, 7 μm, or 10 μm. Suitable powders include, but are not limited to, aluminum, tantalum, magnesium, titanium, niobium, and zirconium.

The dielectrics 20 can be formed on the fused particles 18 in the sheet of material 50 of FIG. 5A so as to provide the sheet of material 50 of FIG. 5B. FIG. 5B is a cross section of the sheet of material 50. When the fused particles 18 are an anode metal, the dielectrics 20 can be an oxide of the anode metal. An example of a suitable method of forming the anode metal oxide dielectric 20 on the fused particles 18 includes mechanisms that convert existing anode metal to anode metal oxide. In these mechanisms, a portion of the fused particles 18 is converted to an oxide that serves as the dielectric 20 while another portion of the fused particles 18 is not converted and serves as the core 22. A suitable method for converting an existing anode metal to an anode metal oxide includes, but is not limited to, anodic oxidation. In anodic oxidation, the sheet of material 50 is placed in an electrolytic bath while a positive voltage is applied to the sheet of material 50. The thickness of the layer of anode metal oxide can be increased by increasing the applied voltage. When the anode metal is aluminum, anodic oxidation forms a layer of the first phase (boehmite phase) of aluminum oxide ($Al_2O_3$) on a layer of aluminum. In one example of anodic oxidation, the anode metal oxide is formed by placing the sheet of material 50 in citric acid while a positive voltage of 400-550 volts is applied to the sheet of material 50 for a period of time. Additionally or alternately, the electrical current that results from the applied voltage can be monitored and the sheet of material 50 can be removed from the electrolytic solution in response to the electrical current falling below a threshold exit leakage current.

The conduits 16 are formed in the fused particles 18 in the sheet of material 50 of FIG. 5B. One or more fluid jets are used to form the conduits. In some instances, the fluid jet is a jet of a liquid that includes, consists of, or consists essentially of water or de-ionized water. FIG. 5C is a cross section of a jet-forming structure. The jet-forming structure includes a nozzle 51. A lumen 52 extends through a body of the nozzle 51 to an opening 53 from which a jet exits the nozzle 51. The illustrated jet-forming structure includes a primary fluid input 54 and a secondary fluid input 55. The jet-forming structure includes a chamber 56 in which primary fluid from the primary fluid input 54 and secondary fluid from the secondary fluid input 55 combine to form the jet fluid before the jet fluid enters the lumen in the nozzle 51. For instance, the fluids can combine to form a suspension, colloid, a liquid containing one or more solutes such as a solution or a liquid without solutes that serves as the jet fluid.

Suitable secondary fluids include, but are limited to fluid or liquid abrasive. An abrasive can be a suspension, colloid, liquid containing one or more solutes such as a solution or a liquid without solutes. Examples of suitable abrasives include, but are not limited to, aluminum oxide pellets and silica beads, and other inert materials with a diameter less than 1 micron and/or within 10% of the diameter of the opening 53. Suitable primary fluids include, but are not limited to, suspensions, colloids, liquid solutions containing one or more solutes in one or more solvents, and liquids without solutes. Examples of suitable primary fluids include, but are not limited to, water. In one example, liquid water is the primary fluid and an abrasive is the secondary fluid.

The use of a secondary fluid such as an abrasive is optional. As a result, the jet-forming structure can be constructed without the secondary fluid input 55 or can be operated without providing a secondary fluid to the secondary fluid input 55. In one example, liquid water is the primary fluid and a secondary fluid is not used.

FIG. 5D illustrates the nozzle 51 from the jet-forming structure of FIG. 5C used to form a conduit in the sheet of material 50 of FIG. 5B. A pressure applied to the jet fluid in the lumen 52 drives the jet fluid through the nozzle opening 53. The width or diameter of the jet stream spreads as it travels toward the sheet of material 50. As a result, a width or diameter of the nozzle opening 53 (labeled $D_n$ in FIG. 5D) can be smaller than the width or diameter of the conduit 16 at the entrance of the conduit (labeled $D_c$ in FIG. 5D). Changing the distance of the nozzle opening 53 from the surface of the sheet of material 50 (labeled d in FIG. 5D) can change the width or diameter of the conduit 16 at the entrance to the conduit 16. In some instances, the distance of the nozzle opening 53 from the surface of the sheet of material 50 is selected such that the width or diameter of the conduit at the entrance of the conduit is greater than or equal to 100%, 102%, or 105% and/or less than 120%, or 200% of the width or diameter of the nozzle opening 53. Examples of a suitable distance of the nozzle opening 53 from the surface of the sheet of material 50 include, but are not limited to, less than one inch, or less than ³⁄₁₆ inch and/or distances greater than 0 inches, or ¹⁄₁₆ inch.

A nozzle 51 from the jet-forming structure of FIG. 5C can have an opening 53 with a width or diameter greater than 100 μm and/or less than 300 μm. As a result, the jet-forming structure can provide a conduit 16 having a diameter or width at the entrance to the conduit 16 that is greater than 100 μm and/or less than or 300 μm.

The pressure applied to the jet fluid in the lumen 52 can determine the ability of the fluid jet to penetrate the sheet of material 50 and the time required to form each conduit 16 to the desired depth. A suitable pressure for applying to the jet fluid in the lumen 52 includes pressures greater than 30,000 psi and/or less than 90,000 psi. When the sheet of material 50 includes a layer of sintered aluminum as the fused particles 18, a suitable pressure for applying to the jet fluid in the lumen 52 includes pressures greater than 30,000 psi and/or less than 90,000 psi. In order to handle a fluid jet driven at these pressure levels, the nozzle 51 can be constructed or materials including, but not limited to, carbide, and tungsten carbide.

FIG. 5D illustrates a conduit 16 that is only partially formed. The fluid jet can be applied to the fused particles 18 for a duration that forms the conduit 16 to the desired depth. For instance, the conduit 16 can extend through the fused particles 18 to the current collector 14 as shown in FIG. 5E.

As noted above, the conduits 16 can be arranged in a two-dimensional periodic pattern such as a hexagonal pattern. In order to sequentially form the conduits 16 in the desired pattern, electronics and/or software (not shown) can be configured to move the nozzle 51 relative to the sheet of material 50 and/or the sheet of material 50 relative to the nozzle 51. As a result, the electronics and/or software control the path that the fluid jet travels across the face of the sheet of material 50. As the fluid jet travels along the path, the pressure of the fluid jet can be reduced when the fluid jet is between forming conduits. For instance, the pressure of the fluid jet can be reduced to a pressure where the fluid jet does not penetrate or does not substantially penetrate the sheet of material 50 as the fluid jet moves to another conduit 16. In some instances, reducing the pressure of the fluid jet includes turning off the fluid jet or stopping the flow of the fluid jet. When the fluid jet is at a location where a conduit is to be formed, the pressure of the fluid jet is increased to the pressure that is desired for forming the conduit. The process of increasing and decreasing the pressure of the fluid jet results in pulsing of the fluid jet as the fluid jet travels across the face of the sheet of material 50.

The nozzle 51 can be configured to generate more than one fluid jet. For instance, FIG. 5F and FIG. 5G illustrate a nozzle precursor. FIG. 5F is a cross section of the nozzle precursor. FIG. 5G is a sideview of the nozzle precursor taken looking in the direction of the arrow labeled G in FIG. 5F. The nozzle precursor is constructed according to FIG. 5C through FIG. 5E but with a jet substrate 57 extending across the lumen 52 of the nozzle so as to close an end of the lumen 52. The jet substrate 57 can be the same material as the nozzle or a different material from the nozzle. When the jet substrate 57 is the same material as the nozzle 51, the jet substrate 57 can be continuous with the nozzle 51 as shown in FIG. 5F or can be a separate component from the nozzle 51.

As shown in FIG. 5H, one or more nozzle openings 53 can be formed in the jet substrate 57 of FIG. 5F and FIG. 5G. FIG. 5H shows one fully formed nozzle opening 53 and another nozzle opening 53 in the process of being formed. FIG. 5I is a sideview of the nozzle precursor of FIG. 5H after all of the nozzle openings 53 have been formed in the jet substrate 57. The sideview of FIG. 5I is taken looking in the direction of the arrow labeled I in FIG. 5H.

Suitable methods of forming the nozzle openings 53 in the jet substrate 57 include, but are not limited to, laser drilling. FIG. 5H shows a laser beam 58 drilling one of the nozzle openings 53 in the jet substrate 57 of FIG. 5F. Laser drilling of the jet substrate 57 can cause melted portions of the nozzle material to solidify and stay on the jet substrate 57. Alternately, portions of the jet substrate 57 can redeposit on the jet substrate 57 during the laser drilling process. These excess materials can be reduced by using a pulsed laser beam 58. The short pulse durations possible with pulsed lasers can provide very high peak powers for moderately energetic pulses. The increased peak power can provide vaporization of the nozzle material during the laser drilling process. This vaporization can eject the material from the jet substrate 57 through the top of the jet substrate 57. Since the material is ejected from the jet substrate 57, the material is not available to re-solidify or re-deposit on the jet substrate 57.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz. The pulse duration and/or frequency can be the same or different as the pulse duration and/or frequency used during laser drilling.

Laser drilling of the nozzle openings 53 can form the one or more nozzle openings 53 with a width or diameter greater than 0 μm, 1 μm and/or less than 50 μm, 200 μm, or 300 μm. As a result, the nozzle can provide conduits 16 that each has a diameter or width at the entrance to the conduit 16 that is 0 μm, or 1 μm and/or less than 50 μm. However, using the disclosed pressure levels with nozzle openings 53 having these dimensions can result in rapid wear on the jet substrate 57 during the process of forming conduits. As a result, the jet-forming structure can be built to permit frequent replacement of the nozzle 51 and/or the nozzle 51 can be built to permit frequent replacement of the jet substrate 57. Additionally or alternately, the jet forming structure can be disposable.

A path of the laser beam 58 across the jet substrate 57 during cutting can be controlled by electronics and/or software. The electronics and/or software can move the laser beam 58 relative to the jet substrate 57 and/or the jet substrate 57 relative to the laser beam 58. Accordingly, the electronics and/or software can control the pattern of nozzle openings 53 formed on the jet substrate 57.

Each nozzle openings 53 on the jet substrate 57 extends through the jet substrate 57 such that the nozzle opening 53 is open to the lumen 52. Accordingly, a pressure applied to the jet fluid in the lumen 52 drives the jet fluid through the one or more nozzle openings 53 to provide a fluid jet exiting from each of the nozzle openings 53. Nozzle openings 53 in a jet substrate 57 that are parallel to one another near the exit of the openings 53 produce fluid jets that are parallel or substantially parallel to one another. As a result, in some instances where the jet substrate 57 includes more than one nozzle opening 53, the nozzle openings 53 are formed so as to be parallel or substantially parallel to one another.

The nozzle openings 53 in FIG. 5I are arranged in the pattern and density that is desired for the conduits 16 on the sheet of material 50. Because one possible pattern for the conduits 16 is a hexagonal pattern, the nozzle openings 53 in FIG. 5I are shown in a hexagonal pattern. The pressure applied to the jet fluid in the nozzle 51 can be sufficient that each of the fluid jets penetrates the sheet of material 50 so as to form one of the conduits 16. For instance, FIG. 5J is a cross section of a nozzle 51 producing multiple fluid jets 59 so as to concurrently form multiple conduits 16 in a cross section of a sheet of material 50.

The pattern of the nozzle openings 53 on the jet substrate 57 is transferred to conduits 16. For instance, FIG. 5J illustrates a linear arrangement of nozzle openings 53 on the jet substrate 57. The linear arrangement of nozzle openings 53 provides a linear arrangement of conduits 16 on the sheet of material 50. As a result, the hexagonal pattern of nozzle openings 53 in FIG. 5I provides a hexagonal pattern of conduits 16 on the sheet of material 50.

Electronics and/or software (not shown) are configured to move the nozzle 51 relative to the sheet of material 50 and/or the sheet of material 50 relative to the nozzle 51. As a result, the electronics and/or software control the path that the fluid jets travel across the face of the sheet of material 50. As discussed above, the pressure of the fluid jets is reduced when the fluid jet is between forming conduits. For instance, the pressure applied to the jet fluid can be reduced to a pressure where the fluid jets do not penetrate or do not substantially penetrate the sheet of material 50 as the fluid jets move to the next conduit locations. In some instances, reducing the pressure of the fluid jet includes turning off the fluid jet or stopping the flow of the fluid jet. When the fluid jet is at a location where a conduit is to be formed, the pressure applied to the jet fluid can be increased to the pressure that is desired for drilling the conduit. The process of increasing and decreasing the pressure of the fluid jet amounts to pulsing of the fluid jet as the fluid jet travels across the face of the sheet of material 50.

The movement of the nozzle 51 and sheet of material relative to the one another allows sets of the conduits to be formed in the sheet of material in a way that provides the desired pattern of conduits 16 in the sheet of material 50. For instance, FIG. 5K is a topview of a sheet of material 50 where multiple different sets of conduits 16 have been formed in the sheet of material 50. The filled-in circles represent conduits 16 in the process of being formed while the open circles represent fully formed conduits 16. Accordingly, FIG. 5J could be a cross section of the sheet of material shown in FIG. 5K taken along the line labeled J in FIG. 5K.

FIG. 5K shows the surface of the sheet of material subdivided into five full rectangles that each encloses thirty conduits arranged in a hexagonal pattern. The rectangles are present to simplify this discussion and are not structural or actually present on the sheet of material 50. The jet substrate 57 can also include thirty nozzle openings 53 arranged in the same hexagonal pattern as the conduits are arranged on the sheet of material 50. Accordingly, the conduits 16 in a single one of the illustrated rectangles can be formed concurrently and the conduits in different rectangles can be formed sequentially by moving the nozzle 51 and sheet of material 50 relative to the one another.

Other methods can be employed to concurrently form multiple conduits 16 in a set of conduits. For instance, multiple different nozzles can be used concurrently to form multiple conduits 16 in a set of conduits. Additionally or alternately, the number of nozzles used concurrently can be increased until all of the conduits that are desired for one or both sides of the sheet of material can be formed concurrently. Further, the size of the jet substrate 57 and/or the area of the jet substrate 57 occupied by nozzle openings 53 can be increased until all of the conduits that are desired for one or both sides of the sheet of material can be formed concurrently.

Forming the conduits can leave cores 22 within the conduits 16 exposed to the interior of the conduits 16 as is most evident in FIG. 5D and FIG. 5E. For instance, forming the conduits can leave at least a portion of the particles with an exposed core where the dielectric is not positioned on the core and the exposed core defines a portion of an interior of the conduit. Accordingly, additional dielectric 20 can be formed in the interior of conduits 16 so as to provide the sheet of material 50 of FIG. 5L. For instance, additional dielectric can be formed on the interior walls of the conduits 16 in FIG. 5E. As an example, when the cores 22 are an anode metal and the dielectric 20 is an anode metal oxide, at least the portion of the cores 22 that are exposed to the contents of the conduits 16 can be converted from the core material to the oxide of the core material. A suitable method for converting an existing anode metal to an anode metal oxide includes, but is not limited to, anodic oxidation. In anodic oxidation, the sheet of material 50 is placed in an electrolytic bath while a positive voltage is applied to the sheet of material 50. The thickness of the layer of anode metal oxide can be increased by increasing the applied voltage. The dielectric 20 formed in the interiors of the conduits 16 can be the first phase of the dielectric. For instance, when the anode metal is aluminum, anodic oxidation forms a layer of the first phase of aluminum oxide (boehmite, $Al_2O_3$) on a layer of aluminum. In one example of anodic oxidation, the anode metal oxide is formed by placing the sheet of material 50 in citric acid while a positive voltage of 400-550 volts is applied to the sheet of material 50 for a period of time. Additionally or alternately, the electrical current that results from the applied voltage can be monitored and the sheet of material 50 can be removed from the electrolytic solution in response to the electrical current falling below a threshold exit leakage current.

Forming additional dielectric 20 in the interior of conduits 16 is optional. The additional dielectric 20 can be formed on the interior walls during subsequent processes. An example of a suitable subsequent process for forming additional dielectric 20 on the interior walls of the conduits 16 includes, but is not limited to, an aging process that is described in more detail below.

One or more anode precursors can be extracted from the sheet of material 50 of FIG. 5E or FIG. 5L. Accordingly, a portion of the sheet of material 50 becomes the anode(s). Suitable methods of removing an anode precursor from the sheet of material 50 include, but are not limited to cutting the anode precursor(s) out of the sheet of material 50. A suitable method of cutting the anode precursor(s) out of the sheet of material 50 include mechanical cutting method such as die cutting where the anode precursor is punched or stamped from a sheet of material 50 using a mechanical die. Another suitable method of cutting the anode precursor(s) out of the sheet of material 50 includes no-contact cutting methods such as laser cutting of the anode precursor.

Laser cutting may provide an increase in yield and efficiency when compared with mechanical cutting methods. Laser cutting of the sheet of material 50 can cause melted portions of the sheet of material 50 to solidify and stay on the resulting anode precursor. Alternately, portions of the sheet can redeposit on the resulting anode precursor during the laser cutting process. These excess materials can be reduced by using a pulsed laser beam. The short pulse durations are possible with pulsed lasers can provide very high peak powers for moderately energetic pulses. The increased peak power can provide vaporization of the sheet of material 50 during the laser cutting process. This vaporization can eject the material from any recess or trench created in the sheet of material 50 through the top of the sheet of material 50. Since the material is ejected from the sheet of material 50, the material is not available to re-solidify or re-deposit on the sheet of material 50.

In some instances, the duration of the pulse is greater than 0 s, or a femtosecond ($10^{-15}$ s) and/or less than a microsecond ($10^{-6}$ s). In one example, the duration of the pulse is greater than 100 femtoseconds and less than 900 femtoseconds. The time between pulses is inversely related to the pulse frequency. Suitable pulse frequencies can be greater than 0 Hz, or 100 Hz, and/or less than 2000 kHz. In one example, the pulse frequency is in a range of 200 kHz to 600 kHz. In some instances, the duration of the pulse is greater than 0 s, or a femtosecond ($10^{-15}$ s) and/or less than a microsecond ($10^{-6}$ s) and the pulse frequency is greater than 0 Hz, or 100 Hz, or 100 kHz and/or less than 2000 kHz. The pulse duration and/or frequency can be the same or different as the pulse duration and/or frequency used during laser drilling.

The power density of the laser beam at the sheet of material 50 can be at a level that a single pulse elevates the temperature of the sheet of material 50 above the boiling point of the anode metal and vaporizes the anode metal. In some instances, power density of the laser beam is such that at least a portion of the sheet of material 50 that is illuminated by the laser reaches the boiling point of the anode metal and vaporizes in a period of time less than or equal to the duration of one pulse when the illuminated portion of the sheet of material 50 is at temperature (23° C. or 25° C.) before the pulse. In an example where the cores 22 include or consist of aluminum as an anode metal, the pulse duration is 820 femtoseconds, the pulse frequency is 400,000 pulses per second, and the laser beam has a power density $7.99 \times 10^{11}$ W/cm$^2$ at the surface of the sheet of material 50. Suitable power densities include, but are not limited to, power densities greater than 0 W/cm$^2$, $1 \times 10^{11}$ W/cm$^2$, or $2 \times 10^5$ W/cm$^2$ and/or less than $9 \times 10^{11}$ W/cm$^2$, or $2 \times 10^5$ W/cm$^{12}$. In some instances, one, two, or three of the parameters selected from the group consisting of pulse duration, frequency, and power density are the same during laser cutting as during laser drilling. The combination of elevated power densities and reduced pulse durations reduces the amount of heat transferred to the sheet of material 50. However, adjusting these parameters may not be sufficient to address an increase in deformation that can result from using laser cutting of the anodes rather than stamped or punched cutting of the anodes.

The path of the laser beam across the face of the sheet of material 50 during cutting can be controlled by electronics and/or software. The electronics and/or software can move the laser beam relative to the sheet of material 50 and/or the sheet of material 50 relative to the laser beam. FIG. 5M illustrates use of a laser 56 to cut anode precursors 58 out of a sheet of material 50 constructed according to FIG. 5E, or FIG. 5L. In some instances, the same laser used to drill the nozzle openings is used to remove the anode precursors 58 from the sheet of material 50. In FIG. 5M, the solid lines and the dashed lines that show the outline of an anode precursor 58 in the sheet of material 50 represent the laser beam pathway during the process of cutting the anode precursor 58 from the sheet of material 50.

The inventors have found that tuning the characteristics for the laser beam path across the sheet of material 50 can also reduce the leakage and deformation to or even below the levels associated with stamping or punching of anodes. For instance, the rate at which the beam is scanned across the sheet of material 50 can be tuned. Faster scan rates reduce the amount of energy that is absorbed by the anode precursor. In some instances, the laser beam is scanned across the sheet of material 50 at a rate greater than 0 mm/sec, 100 mm/sec, or 600 mm/sec, and/or less than 900 mm/sec, or 1100 mm/sec.

Reducing the spot size can also reduce the amount of thermal energy transferred to the sheet of material 50. Suitable spot sizes include, but are not limited to, spot having a diameter or major axis greater than 10 microns, 30 microns and/or less than 50 microns, or 150 microns. Additionally or alternately, the spot size can be selected to produce spot overlaps less than 100%. A spot is the area of the sheet of material 50 illuminated by the laser beam during a pulse. Spot overlap is the overlap of a spot with the spot provided by the previous pulse. Suitable spot overlaps include spot overlaps greater than 70%, or 90% and/or less than 100%. The spot size can be selected to provide these levels of spot overlap when combined with the above scan rates and pulse frequencies.

Increasing the beam scan rate can reduce the depth that the laser beam cuts into the sheet of material 50. As a result, multiple passes of the laser beam along a pathway may be necessary in order to completely cut the anode precursor out of the sheet of material 50. This result is evident in the pathway labeled P FIG. 2G. The pathway includes dashed lines that indicate where the laser beam has cut into the sheet of material 50 without cutting through the sheet of material 50. The pathway also includes solid lines that indicate the portion of the anode precursor outline where the laser beam has cut through the sheet of material 50. Additionally, the arrow labeled A indicates the travel direction travel for the laser beam relative to the anode precursor. At the start of the laser cutting, the laser beam may be incident on the anode metal oxide. Once the laser beam has cut through the anode metal oxide, the laser beam is incident on the anode metal.

The need for multiple passes of the laser beam in order to cut through the sheet of material 50 means that each location along the beam pathway is not exposed to the laser beam energy for a pass interval. The pass interval can be the time between passes of the laser beam and/or can be the period of time that passes between each point along the pathway being exposed to the laser beam. Suitable pass intervals include, but are not limited to, pass intervals more than 0.1 seconds per pass and/or less than 3 seconds per pass. In some instances, the pass interval is selected such that more than 5, or 10 and/or less than 100 passes of the laser beam around the entire outline of the anode precursor are required to completely extract an anode precursor from the sheet of material 50.

The laser pathway can includes multiple different tracks. FIG. 5N is a topview of a portion of a sheet of material 50. A portion of a laser pathway on the sheet of material 50 is labeled P. The laser pathway includes a first track 59 represented by dashed lines and a second track 60 represented by solid lines. The first track 59 represents the track that the laser follows during a pass along the laser pathway. The second track 60 represents the track that the laser follows during a different pass along the laser pathway. The first track 59 has a width labeled w and the second track 60 has a width labeled W. When the first track 59 and the second track 60 are followed by the same laser or by lasers with the same spot size, the width of the first track 59 will be the same or about the same as the width of the second track 60.

The second track 60 is offset from the first track 59 by a distance labeled OS in FIG. 5N. The amount of offset can be selected such that the second track 60 partially overlaps the first track 59 as shown in FIG. 5N. The use of partially overlapping tracks while laser cutting the anode precursor widens the trench that the laser forms in the sheet of material 50 to a width larger than the spot diameter. The cutting of a wider trench can reduce the amount of thermal energy that is applied to previously formed surfaces in the trench. The track overlap percentage can be the overlap distance divided by the width of the overlapped track. Suitable track overlap percentages include, but are not limited to, track overlap percentages greater than 25% or 30% and/or less than 50% or 75%. The offset distance can be a function of spot size. For instance, when the spot size has a diameter of 40 microns, a suitable offset distances can be any distance between 0 and 40 microns such as 10 to 30 microns.

In some instances, the different tracks extend around the perimeter of the anode and/or surround the perimeter of the anode. For instance, the entire length of the laser pathway shown FIG. 5M can include two tracks that partially overlap as shown in FIG. 5N. In other words, the laser pathway of FIG. 5N can represent the laser pathway of any straight portion of the laser pathway shown FIG. 5M. Accordingly, the laser can trace all, or substantially all, of the anode perimeter along one track and later trace all, or substantially all, of the anode perimeter along another track that partially overlaps the prior track as described above. Alternately, different tracks can partially overlap along one or more portions of the anode perimeter but completely overlap along one or more other portions of the anode perimeter.

Although the laser pathway in FIG. 5N is illustrated as having two tracks, the laser pathway can include a single track or more than two tracks. During the laser cutting process, a track can be followed once or more than once. For instance, when a laser pathway includes two tracks as is shown in FIG. 5N, the laser can alternate between different tracks on subsequent passes. As an example, the laser can follow the first track 59, the second track 60, the first track 59, the second track 60, and so on until the trench extends through the sheet of material 50 and the anode precursor is extracted from the sheet of material 50.

The tracks can be selected so as to provide the edges of the anode with the desired taper and/or shape as described in the context of FIG. 3C. For the purpose of illustration, FIG. 5O illustrates tracks selected so as to provide an anode with a linearly tapered edge although other shapes are possible. FIG. 5O shows four different images that each includes a cross section of the same part of the sheet of material 50. In each image, a laser is positioned over the sheet of material 50. Each of the images represents a different track. The arrows indicate where the light is incident on the sheet of material 50 as the laser is moved along the track associated with that image. The sheet of material 50 shows the portion of the sheet of material 50 that remains after the laser have removed a portion of the sheet of material 50. As is evident from the rightmost image, the tracks have been selected such that the laser cuts through the sheet of material 50 and also provides an anode with a tapered edge. Although the illustrated taper is a linear taper, the taper need not be linear.

In some instances, the anode precursor is fabricated using one, two, three, four, five or six parameters selected from the group consisting of a laser pulse duration, pulse frequency, power density, scan rate, pass interval, and pass number where the laser pulse duration is 400 femtoseconds, the laser pulse frequency is 400 kHz, the power density is $7.99 \times 10^{11}$ W/cm$^2$, the scan rate is 720 mm/sec, the pass interval is 0.25 s, and the pass number is 60.

The inventors have found that using a laser to extract one or more anode precursors from the sheet of material 50 can convert at least a portion of the first phase of the dielectric 20 to the second phase of the dielectric. For instance, using a laser to cut a sheet of material 50 having fused particles 18 with aluminum cores and the boehmite phase of aluminum oxide (Al$_2$O$_3$) as the dielectric can convert the boehmite phase of aluminum oxide to the second phase of the aluminum oxide (alpha-corundum oxide, α-Al$_2$O$_3$). This conversion is believed to be a result of the heat generated during the laser cutting process. As a result, the conversion primarily occurs at and/or near the edge of the anode precursor. As noted above, the second phase of the anode metal oxide is often undesirable. For instance, the second phase of the anode metal oxide can be more electrically conductive than the first phase of the anode metal oxide. As an example, the alpha corundum oxide (α-Al$_2$O$_3$) phase of aluminum oxide has properties of a semiconductor. As a result, the alpha phase corundum oxide (α-Al$_2$O$_3$) is not suitable for use as a dielectric and is accordingly associated with undesirably high levels of leakage and deformation. However, alpha phase corundum oxide (α-Al$_2$O$_3$) is very stable and is difficult to convert back into the boehmite phase of aluminum oxide. While adjustments to the laser cutting parameters disclosed above can partially address the leakage and deformation associated with the this conversion from the first phase of the anode metal oxide to the second phase of the anode metal oxide, an oxide extraction phase discussed in more detail below can further reduce the leakage and deformation caused by this conversion.

The one or more anode precursors constructed having fused particles 18 according to FIG. 5E or FIG. 5L are included in a capacitor precursor according to FIG. 3A through FIG. 3C. For instance, one or more of the anode precursors are combined with one or more separators 34 and one or more cathodes so as to form an electrode assembly 32 with the components arranged as disclosed in the context of FIG. 3A through FIG. 3C. The electrode assembly 32 is placed in a capacitor case 36 along with the electrolyte. Any electrical connections needed for operation of the capacitor precursor are made before and/or after the electrode assembly 32 is placed in the capacitor case 36 and the capacitor case 36 is sealed.

The capacitor precursor can optionally be put through an aging phase. The aging phase can be configured to form an anode metal oxide on any anode metal that is exposed at the walls of the conduits 16 as shown in FIG. 5E and/or at the edges of the one or more anode precursors in the capacitor and/or at the edges of the anode precursor as a result of laser cutting an anode precursor such as anode precursors constructed according to FIG. 5E, or FIG. 5L. The aging process can use water in the electrolyte to form the anode metal oxide. The phase of the anode metal oxide formed during the aging phase is not necessarily the same as the first phase of the anode metal oxide and/or the second phase of the anode metal oxide. For instance, when the anode metal is aluminum, the anode metal oxide formed during the aging phase is not the first phase (boehmite phase) but is similar.

Suitable methods for aging the capacitor precursor include, but are not limited to, holding the capacitor at an elevated temperature while charged. For instance, in some instances, aging includes holding the capacitor at a temperature greater than 50° C. or 70° C. and/or less than 100° C. or 200° C. for a time greater than 2 hours, or 20 hours, and/or less than 50 hours or one hundred hours while charged to a voltage greater than 50 V, or 200 V and/or less than 600 V or 800 V. In one example, aging includes holding the capacitor at about 85° C. for 24 to 36 hours while charged to about 400 V.

An oxide phase extraction can be performed on the capacitor precursor 61. The oxide phase extraction can include an oxide removal stage that removes all or a portion of the second phase of the anode metal oxide from the anode precursor and/or from the portion of the sheet of material 50 that serves as the anode precursor. Accordingly, the oxide removal stage can remove the second phase of the anode metal oxide that is positioned at the edges of the anode precursor as a result of laser cutting an anode precursor such as an anode precursor constructed according to FIG. 5E, or FIG. 5L.

In some instances, the oxide phase extraction moves all or a portion of the second phase of the anode metal oxide from the anode precursor into the electrolyte. The oxide phase extraction can be performed such that the first phase of the anode metal oxide remains intact or remains substantially intact. The oxide phase extraction can also include an oxide restoration stage that forms the anode metal oxide on exposed anode metal and/or on areas where the anode metal oxide is thin. The phase of the anode metal oxide formed during the oxide restoration stage can be the first phase of the anode metal oxide. As a result, the oxide restoration stage can restore the first phase of the anode metal oxide in places where the first phase and/or second of the anode metal oxide was removed or damaged during the oxide removal stage. Suitable methods for the oxide restoration stage can be the same or similar to the methods used in the aging phase.

An example oxide phase extraction includes one or more cycles. Each cycle can include the oxide removal stage followed by the oxide restoration phase. When the oxide phase extraction includes multiple cycles, the cycles can be repeated in series. An example oxide phase extraction includes a high temperature stage that acts as an oxide removal stage followed by a low temperature stage and a charging stage. The low temperature stage can be performed between the high temperature stage and the charging stage. The high temperature stage can be configured to move all or a portion of the second phase of the anode metal oxide from the anode precursor and into the electrolyte. The low temperature stage can be configured to form the first phase of the anode metal oxide on any anode metal that becomes exposed during the high temperature stage. The charging stage causes a current surge through the anode precursor that reforms the anode metal oxide. For instance, the charging stage can form the first phase of the anode metal oxide on the anode precursor from oxygen in the electrolyte. Accordingly, the low temperature stage and the charging stage together can serve as an oxide restoration stage.

An example of a single cycle of the oxide phase extraction includes a high temperature stage where the capacitor precursor is exposed to a temperature $T_1$ for a time period $P_1$; a low temperature stage where the capacitor precursor is exposed to a temperature $T_2$ for a time period $P_2$; and a charging stage where the capacitor precursor is charged to $V_1$ and discharged. The cycle of the oxide phase extraction can be performed N times.

Examples of suitable $T_1$ include, but are not limited to, $T_1$ greater than 45° C., or 50° C. and/or less than 90° C. or 100° C. In some instances, prolonged exposure of the capacitor to temperatures above 90° C. can damage one or more components of the capacitor. Examples of suitable $P_1$ include, but are not limited to, $P_1$ greater than 0.5 hours and/or less than 2 days. The variables $T_1$ and $P_1$ can be a function of materials and/or configuration. Additionally, the value of $P_1$ can be a function of $T_1$. Exposure of a capacitor precursor 61 to increased temperatures for prolonged periods of time can damage the capacitor precursor components. As a result, as $T_1$ increases, it is generally desirable to reduce the value of $P_1$. For example, when $T_1$ is above 85° C., $P_1$ can be less than 2 hours but when $T_1$ is below 50° C., $P_1$ can be more than 1 day.

Examples of suitable $T_2$ include, but are not limited to, $T_2$ greater than 35° C., or 45° C. and/or less than 50° C. or 70° C. Examples of suitable $P_2$ include, but are not limited to, $P_2$ greater than 10 minutes and/or less than 100 minutes or one day. In some instances, $T_1$ is higher than $T_2$ but $P_1$ is longer than $P_2$. Examples of suitable $V_1$ include, but are not limited to, $V_1$ greater than 200 V, 400V and/or less than 500V or 600V. Examples of suitable N include, but are not limited to, N greater than 0, 1, or 8 and/or less than 15, 25, or 35.

An example of the oxide phase extraction includes any one, any two, any three, any four, any five, or any six features selected from the group consisting of $T_1$ greater than 45° C., or 50° C. and/or less than 90° C. or 100° C., $P_1$ greater than 0.5 hours and/or less than 2 days, $T_2$ greater than 35° C., or 45° C. and/or less than 50° C. or 70° C., $P_2$ greater than 10 minutes and/or less than 100 minutes or one day, $V_1$ greater than 200 V, 400V and/or less than 500V or 600V. In some instances, this oxide phase extraction is performed for a number of cycles, N, greater than 0, 1, or 8 and/or less than 15, 25, or 35.

When the cores 22 include aluminum as the anode metal and the first phase of the anode metal oxide is the boehmite phase of aluminum oxide, an example of a cycle the oxide phase extraction includes a high temperature stage where the capacitor precursor is placed in a 90° C. (+/−5° C.) oven for 1 hour (+/−5 min); a low temperature stage where the capacitor precursor is placed in a 37° C. (+/−5° C.) oven for 30 minutes (+/−5 min); a charging stage where the capacitor precursor is charged to 422.5 Volts and discharged. To execute the oxide phase extraction, this cycle of the oxide phase extraction can be performed once or sequentially repeated for 1 or more cycles to 35 or fewer cycles. The total number of cycles performed can be a function of the capacitor response to the preceding cycles. For instance, performance of additional cycles can be optional or skipped once the time needed to charge the capacitor after a cycle is less than a threshold. In one example, the threshold is 5% of the time needed to charge the capacitor before the cycle.

The exact number of cycles needed can be a function of the properties of the sheet of material 50 and the thermal effect of laser cutting on the edge. As a result, the number of cycles that are performed can be variable. For example, the time needed to charge the capacitor precursor can be measured after each cycle. The measured charge time can be compared to a charge time threshold. If the charge time for cycle j exceeds the threshold, then an additional cycle can be performed. When the charge time for cycle j falls below the threshold, additional cycles are not performed. For instance, the threshold can be a percentage of the time needed to charge the capacitor after the immediately preceding cycle. In one example, the threshold is 5% of the time needed to charge the capacitor before the cycle.

Completion of the oxide extraction phase provides the anode and capacitor of FIG. 3A through FIG. 3C. Accordingly, the capacitor is ready for use in the desired application and/or for resale.

Figure 6:
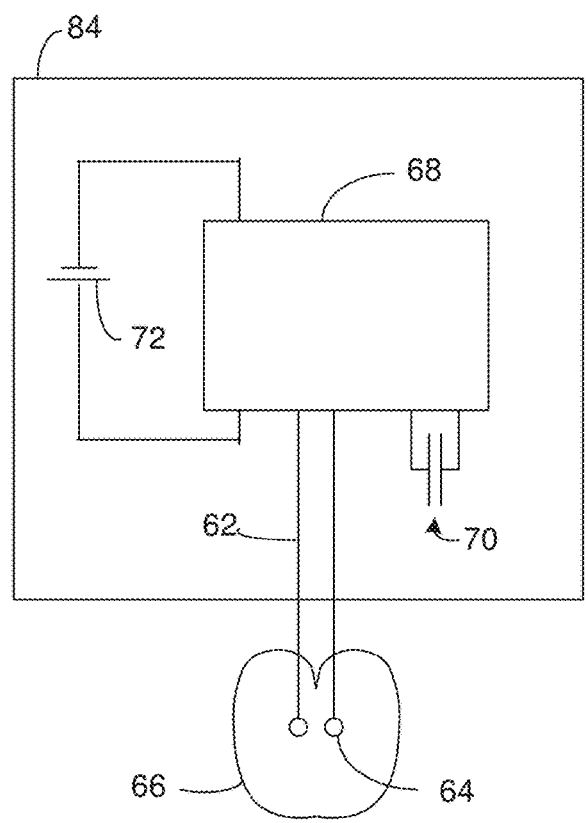
FIG. 6 is a schematic diagram of a defibrillation system that includes an Implantable Cardioverter Defibrillator (ICD) that employs one or more capacitors constructed according to FIG. 1A through FIG. 5O.

The above capacitors can be used in medical devices such as an Implantable Cardioverter Defibrillator (ICD). FIG. 6 is a schematic diagram of a defibrillation system that includes an Implantable Cardioverter Defibrillator (ICD) that employs one or more capacitors constructed as disclosed above. The defibrillation system includes lead lines 62 connected to electrodes 64 in contact with the heart. Although the defibrillation system is shown with two electrodes 64, the defibrillation system may include three or more electrodes 64 and/or three or more lead lines. The specific positions of the electrodes 64 relative to the heart 66 is dependent upon the requirements of the patient.

The defibrillation system also includes a processing unit 68. The lead lines 62 provide electrical communication between the processing unit 68 and the electrodes 64. The processing unit 68 is also in electrical communication with one or more capacitors constructed as disclosed above.

The processing unit 68 receives power from a battery 72. The processing unit 68 can place the battery 72 in electrical communication with the one or more capacitors 70. For instance, the processing unit 68 can cause the battery 72 to charge the one or more capacitors 70. Additionally, the processing unit 68 can place the one or more capacitors 70 in electrical communication with the lead lines 62. For instance, the processing unit 68 can cause the one or more capacitors to be discharged such that electrical energy stored in the one or more capacitors is delivered to the heart through all or a portion of the electrodes 64. The processing unit 68, the battery 72 and the one or more capacitors 70 are positioned in a case 84.

During operation of the defibrillation system, the defibrillation system employs output from the lead lines 62 to monitor the heart and diagnose when defibrillation shocks should be provided. When the processing unit 68 identifies that defibrillation shocks are needed, the processing unit 68 provides the heart with one or more defibrillation shocks. To provide a defibrillation shock, the processing unit 68 employs energy from the battery 72 to charge the one or more capacitors 70. Once the one or more capacitors are charged, the processing unit 68 causes these capacitors to be discharged such that energy stored in the capacitors is delivered to the heart through all or a portion of the electrodes 64 in the form of defibrillation shocks. During the defibrillation shocks, the defibrillator requires that one or more pulses be delivered from the battery 72 to the one or more capacitors. Each pulse is generally associated with a defibrillation shock. The duration of each pulse is generally about 8 to 12 seconds with the pulses separated by a delay time that is based on how fast the battery charges the capacitor and determining the appropriate point to provide the defibrillation shock.

Suitable processing units 68 can include, but are not limited to, analog electrical circuits, digital electrical circuits, processors, microprocessors, digital signal processors (DSPs), computers, microcomputers, or combinations suitable for performing the monitoring and control functions. In some instances, the processing unit 68 has access to a memory that includes instructions to be executed by the processing unit 68 during performance of the control and monitoring functions.

The sequence of events disclosed above for forming an anode can be performed in a sequence other than the disclosed sequence. For instance, the oxide phase extraction can be performed on an anode precursor(s) before the capacitor is assembled.

Although the above methods of forming an anode have been disclosed in the context of a capacitor, the above oxide phase extraction can also be applied to the fabrication of anodes, cathodes, positive electrodes, and/or negative electrodes in batteries.

Although the above methods of forming the capacitor makes use of anodes having edges tapered by laser cutting, the corresponding cathodes can also include tapered edges as shown in FIG. 3A. The edges of the cathodes can be shaped using a laser as described above and/or by other shaping mechanisms.

Although the electrode assembly 32 is disclosed in the context of anodes alternating with cathodes other electrode arrangements are possible as is known in the capacitor and battery arts.

Although not shown above, portions of the anode current collector 14 that are exposed while forming oxide at one or more points in the fabrication process may also be converted to an oxide of the anode current collector 14 material. These regions of oxide in the anode current collector 14 can prevent the electrolyte from coming into direct contact with the electrically conducting portions of the anode current collector 14.

Example 1

Figure 7:
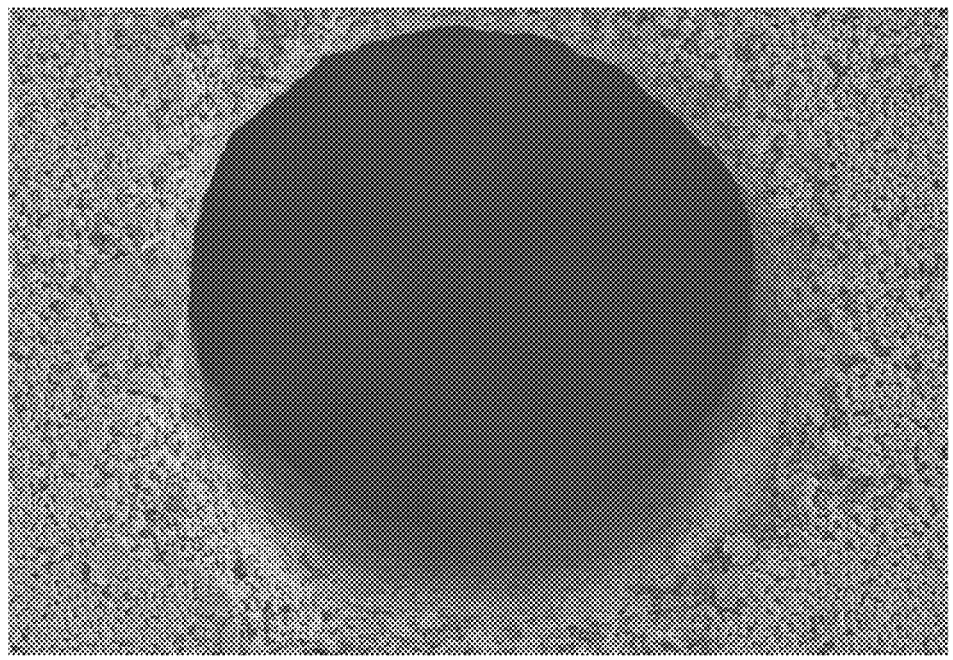
FIG. 7 illustrates results of a jet forming structure according to FIG. 5C being used with a nozzle opening diameter of 200 microns to form a conduit through a 830 μm thick layer of sintered aluminum.

A jet forming structure according to FIG. 5C was used with a nozzle opening diameter of 200 microns to form a conduit through a 830 µm thick layer of sintered aluminum. The jet fluid was water and excluded an abrasive. The result is illustrated in FIG. 7.

Example 2

Figure 8:
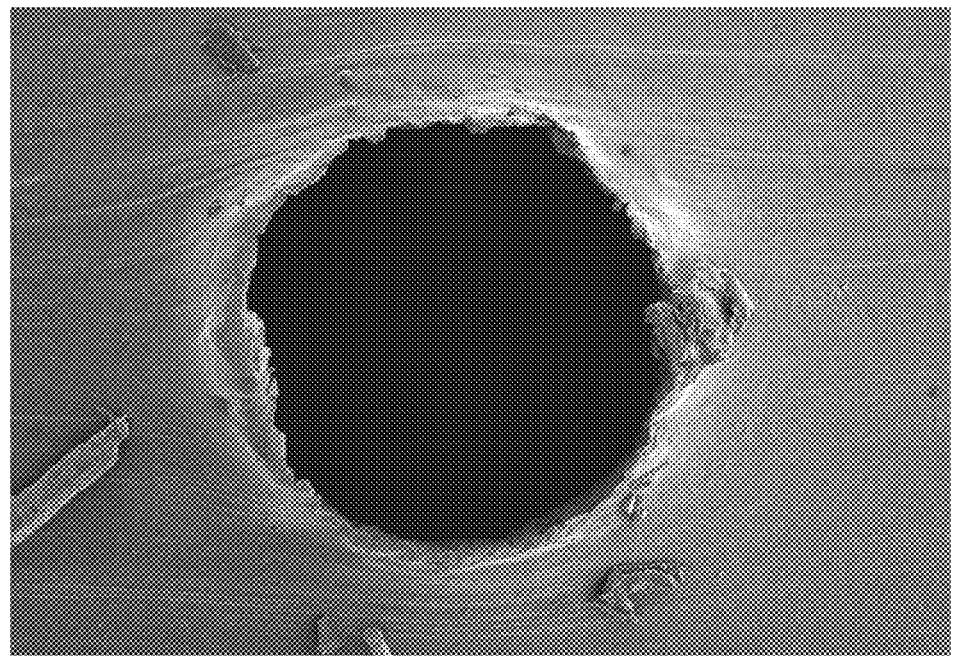
FIG. 8 illustrates results of a jet forming structure according to FIG. 5C being used with a nozzle opening diameter of 200 microns to form a conduit through a 115 μm thick layer of aluminum foil.

A jet forming structure according to FIG. 5C was used with a nozzle opening diameter of 200 microns to form a conduit through a 115 µm thick layer of raw aluminum foil. The jet fluid was water and excluded an abrasive. The result is illustrated in FIG. 8.

Example 3

Figure 9:
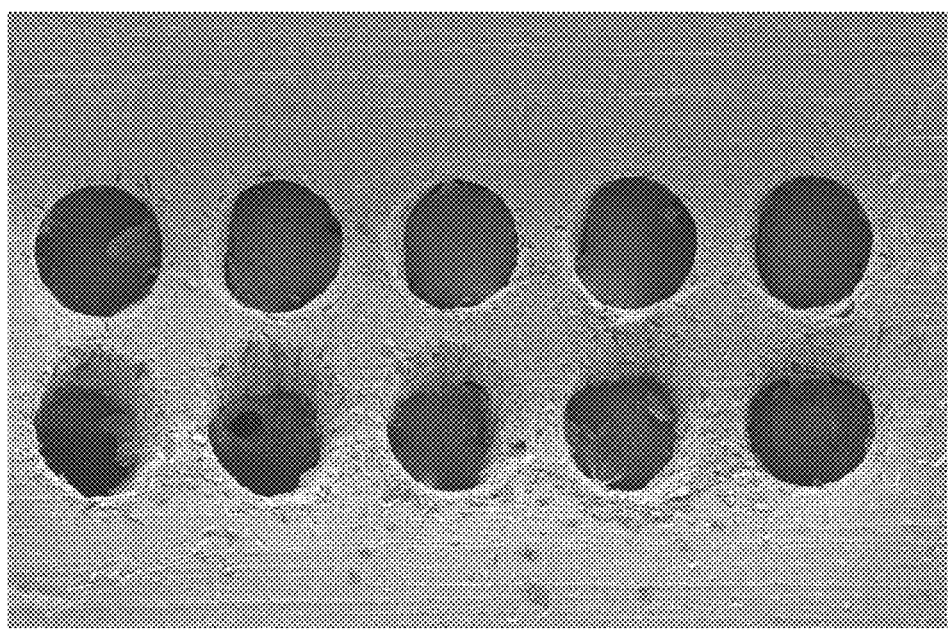
FIG. 9 illustrates results of a jet forming structure according to FIG. 5C being used with a nozzle opening diameter of 200 microns to sequentially form multiple conduit through a 830 μm thick layer of sintered aluminum.

A jet forming structure according to FIG. 5C was used with a nozzle opening diameter of 200 microns to sequentially form multiple conduit through a 830 µm thick layer of sintered aluminum. The jet fluid was water and excluded an abrasive. The result is illustrated in FIG. 9.

Although the anode is disclosed in the context of a capacitor, the disclosed methods of increasing electrode area can be employed in the electrodes of other electrochemical devices such as batteries, fuel cells, and solar cells.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of fabricating an electrode of an electrochemical cell, comprising:
   sintering a powder to form a porous active layer of the electrode; and
   using a fluid jet to form a conduit in the active layer of the electrode such that an average width of pores in the active layer is less than half a width of the conduit.

2. The method of claim 1, wherein the fluid jet comprises water and excludes an abrasive.

3. The method of claim 1, wherein the fluid jet includes an abrasive and a primary liquid, wherein the abrasive is a silica bead having a diameter of less than 1 micron.

4. The method of claim 1, wherein the pores are defined by particles that each includes a dielectric on a core before the fluid jet is used to form the conduit.

5. The method of claim 4, wherein the conduit is formed such that at least a portion of the particles have an exposed core where the dielectric is not positioned on the core and the exposed core defines a portion of an interior of the conduit.

6. The method of claim 5, further comprising forming the dielectric on the exposed cores in the interior of the conduit after using the fluid jet to form the conduit.

7. The method of claim 1, wherein the conduit is one of multiple conduits formed in the active layer and the fluid jet is used to sequentially form the conduits.

8. The method of claim 1, wherein the fluid jet exits from an opening in a nozzle and further comprising: using a femtosecond laser to form the opening in the nozzle.

9. The method of claim 8, wherein the opening is 1 to 300 microns wide.

10. The method of claim 1, wherein the fluid jet is one of multiple fluid jets that each exit from a different opening on a nozzle.

11. The method of claim 10, wherein the openings on the nozzle are arrange in a periodic two-dimensional pattern.

12. The method of claim 10, further comprising: using a laser to form each of the openings in the nozzle.

13. The method of claim 10, wherein the conduit is one of multiple conduits formed in the active layer and the each of the fluid jets is used to concurrently form a different one of the conduits.

14. The method of claim 13, wherein the opening are 1 to 50 microns wide.

15. The method of claim 13, wherein the conduits are 1 to 50 microns wide.

16. The method of claim 10, wherein the conduit is one of multiple conduits formed in the active layer and the fluid jets are used to concurrently form a first portion of the conduits with each of the fluid jets forming a different one of the conduits included in the first portion of the conduits.

17. The method of claim 16, further comprising: using the fluid jets to concurrently form a second portion of the conduits such that each of the fluid jets forms a different one of the conduits included in the second portion of the conduits, the second portion of the conduits being formed after the first portion of the conduits.

18. The method of claim 1, wherein an average width of the conduits is 2-20 times an average width of the pores, and wherein the pores are open to an interior of the conduits.

19. The method of claim 1, wherein the powder is sintered on a current collector, and wherein using a fluid jet to form a conduit in the active layer comprises drilling a conduit from an exterior surface of the active layer into the active layer toward the current collector.

20. The method of claim 19, wherein drilling a conduit from an exterior surface of the active layer into the active layer toward the current collector comprises drilling the conduit substantially perpendicular to a surface of the current collector and/or a surface of the active layer.

21. The method of claim 19, wherein the powder is an aluminum powder.

22. The method of claim 19, wherein the powder is a tantalum powder.

23. The method of claim 1, further comprising:
fabricating a capacitor that includes an electrode that includes the active layer.

24. The method of claim 1, wherein the powder is sintered before the conduit is formed.

25. The method of claim 1, wherein the pores extend through an entire thickness of the active layer.

* * * * *